(12) United States Patent
Schreter

(10) Patent No.: US 11,675,778 B2
(45) Date of Patent: Jun. 13, 2023

(54) SCALABLE TRANSACTION MANAGER FOR DISTRIBUTED DATABASES

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/332,564

(22) Filed: May 27, 2021

(65) Prior Publication Data

US 2022/0391382 A1   Dec. 8, 2022

(51) Int. Cl.
*G06F 16/23*  (2019.01)
*G06F 16/27*  (2019.01)

(52) U.S. Cl.
CPC ......... *G06F 16/2379* (2019.01); *G06F 16/27* (2019.01); *G06F 16/278* (2019.01)

(58) Field of Classification Search
CPC ..... G06F 16/2379; G06F 16/278; G06F 16/27
See application file for complete search history.

(56) References Cited

U.S. PATENT DOCUMENTS

| 2014/0149368 | A1* | 5/2014 | Lee | G06F 16/20 707/703 |
| 2014/0279932 | A1* | 9/2014 | Knop | H04L 67/59 707/684 |
| 2016/0147813 | A1 | 5/2016 | Lee et al. | |
| 2019/0332695 | A1* | 10/2019 | Bensberg | G06F 16/211 |
| 2020/0310925 | A1* | 10/2020 | Kottler | G06F 11/1471 |

OTHER PUBLICATIONS

X/Open CAE Specification, Technical Standard, Distributed Transaction Processing: The XA Specification, Dec. 1991 (available at https://pubs.opengroup.org/onlinepubs/009680699/toc.pdf).
Kolltveit, H. et al., "Efficient High Availability Commit Processing", The Third International Conference on Availability, Reliability and Security, IEEE Computer Society, (2008), pp. 64-71.
Wikipedia, "Two-phase commit protocol," Mar. 4, 2019, (available at https://en.wikipedia.org/w/index.php?title=Two-phase_commit_protocol&oldid=886121497.
Extended European Search Report issued in European Application No. 21204109.9-1203, dated Apr. 26, 2022, 11 pages.

\* cited by examiner

*Primary Examiner* — Alford W Kindred
*Assistant Examiner* — Lin Lin M Htay
(74) *Attorney, Agent, or Firm* — Mintz Levin Cohn Ferris Glovsky and Popeo, P.C.

(57) ABSTRACT

A method may include responding to a transaction by sending, to a first data partition participating in the transaction, a first request to set a first transaction control block at the first data partition to a preparing state. In response to the transaction affecting multiple data partitions, a second request to set a second transaction control block at a second data partition to the preparing state may be sent to the second data partition. A third request to add the first data partition and the second data partition as participants of the transaction may be sent to the transaction coordinator. The transaction coordinator may determine, based on a first response of the first data partition and a second response of the second data partition, an outcome of the transaction. The transaction may be rolled back if the first response and/or the second response indicate an inability to commit the transaction.

17 Claims, 14 Drawing Sheets

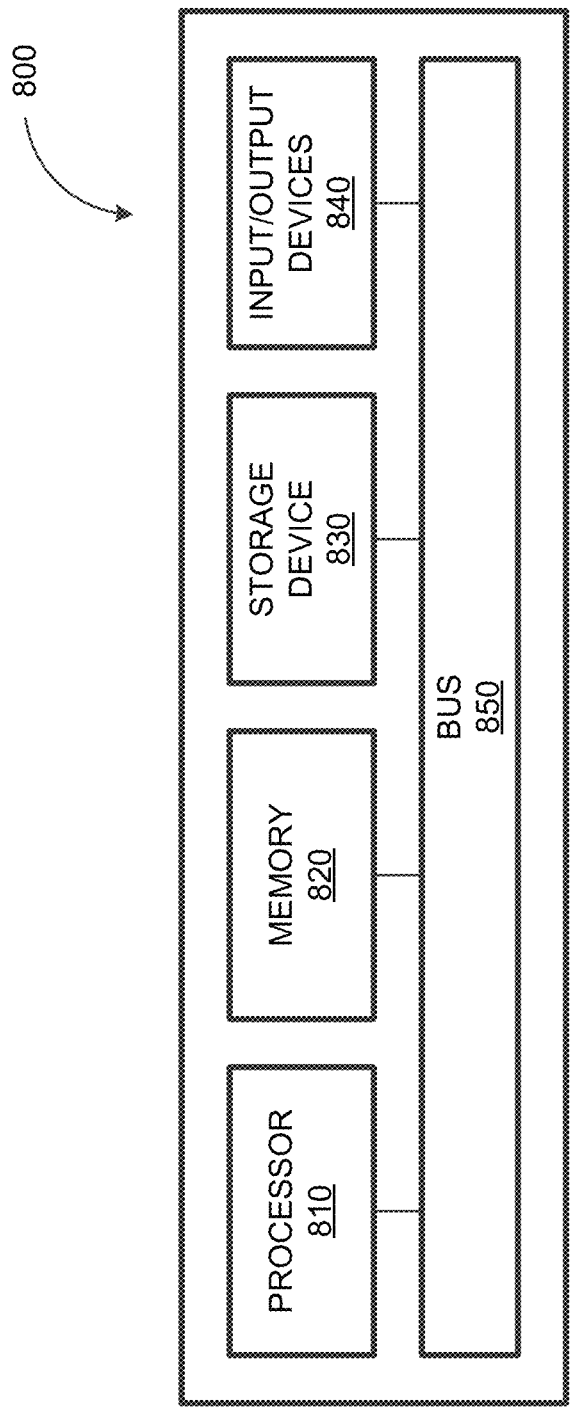

SCALABLE TRANSACTION MANAGER FOR DISTRIBUTED DATABASES

TECHNICAL FIELD

The subject matter described herein relates generally to database processing and more specifically to a transaction management in a distributed database system.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for transaction management. In some example embodiments, there is provided a system that includes at least one processor and at least one memory. The at least one memory may include program code that provides operations when executed by the at least one processor. The operations may include: responding to a transaction by sending, to a first data partition participating in the transaction, a first request to set a first transaction control block at the first data partition to a preparing state; in response to the transaction affecting a plurality of data partitions including the first data partition and a second data partition, sending, to the second data partition, a second request to set a second transaction control block at the second data partition to the preparing state, and sending, to a transaction coordinator, a third request to add the first data partition and the second data partition as participants of the transaction, the transaction coordinator determining, based at least on a first response of the first data partition to the first request and a second response of the second data partition to the second request, an outcome of the transaction, the transaction being rolled back in response to the first response and/or the second response indicating an inability to commit the transaction.

In some variations, one or more features disclosed herein including the following features can optionally be included in any feasible combination. The transaction may be rolled back by the transaction coordinator sending, to each of the first data partition and the second data partition, a fourth request to abort the transaction.

In some variations, the first data partition may respond to the fourth request by at least setting the first transaction control block to an aborting state. The second data partition may respond to the fourth request by at least setting the second transaction control block to the aborting state.

In some variations, the first transaction control block and the second transaction control block may be set to an aborted state upon writing a rollback log record for the transaction and completing one or more post-rollback operations. Setting the first transaction control block and the second transaction control block to the aborted state may render the first transaction control block and the second transaction control block eligible for garbage collection.

In some variations, the first data partition and the second data partition may respond to the fourth request by at least writing, at each of the first data partition and the second data partition, an abort log record for the transaction.

In some variations, the transaction may be committed in response to the first response and the second response requesting to commit the transaction. The transaction coordinator may commit the transaction by at least writing a commit log record for the transaction.

In some variations, the transaction coordinator may further commit the transaction by at least sending, to each of the first data partition and the second data partition, a fourth request to write a corresponding commit log record for the transaction.

In some variations, the first transaction control block and the second transaction control block may be removed upon each of the first data partition and the second data partition writing the corresponding commit log record for the transaction.

In some variations, the transaction coordinator may be selected for the transaction in response to determining that no transaction coordinator is associated with the transaction.

In some variations, the transaction coordinator may generate, at the transaction coordinator, a third transaction control block for the transaction in response to determining that no transaction control block exists for the transaction at the transaction coordinator. The transaction coordinator may update the third transaction control block by at least including the first data partition and the second data partition as participants of the transaction.

In some variations, the transaction may be determined to be a local transaction based at least on the transaction affecting a single data partition.

In some variations, the local transaction may be executed at the first data partition by at least determining whether the transaction is associated with one or more conflicts.

In some variations, the first data partition may set the first transaction control block to a committing state in response to the transaction being free from conflicts. The first data partition may further set the first transaction control block to a committed state upon writing a commit log record for the transaction.

In some variations, the first data partition may set the first transaction control block to an aborting state in response to the transaction being associated with one or more conflicts. The first data partition may further set the first transaction control block to an aborted state upon writing a rollback log record for the transaction and completing one or more post-rollback operations.

In some variations, the outcome of the transaction may be communicated to a client device associated with the transaction.

In some variations, the transaction may be received from a frontend driver.

In another aspect, there is provided a method for transaction management. The method may include: responding to a transaction by sending, to a first data partition participating in the transaction, a first request to set a first transaction control block at the first data partition to a preparing state;

in response to the transaction affecting a plurality of data partitions including the first data partition and a second data partition, sending, to the second data partition, a second request to set a second transaction control block at the second data partition to the preparing state, and sending, to a transaction coordinator, a third request to add the first data partition and the second data partition as participants of the transaction, the transaction coordinator determining, based at least on a first response of the first data partition to the first request and a second response of the second data partition to the second request, an outcome of the transaction, the transaction being rolled back in response to the first response and/or the second response indicating an inability to commit the transaction.

In another aspect, there is provided a computer program product including a non-transitory computer readable medium storing instructions. The instructions may cause operations may executed by at least one data processor. The operations may include: responding to a transaction by sending, to a first data partition participating in the transaction, a first request to set a first transaction control block at the first data partition to a preparing state; in response to the transaction affecting a plurality of data partitions including the first data partition and a second data partition, sending, to the second data partition, a second request to set a second transaction control block at the second data partition to the preparing state, and sending, to a transaction coordinator, a third request to add the first data partition and the second data partition as participants of the transaction, the transaction coordinator determining, based at least on a first response of the first data partition to the first request and a second response of the second data partition to the second request, an outcome of the transaction, the transaction being rolled back in response to the first response and/or the second response indicating an inability to commit the transaction.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to transaction management in a distributed database system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

In the drawings,

FIG. 8 depicts a block diagram illustrating an example of a computing system, in accordance with some example embodiments.

When practical, similar reference numbers denote similar structures, features, or elements.

DETAILED DESCRIPTION

Figure 1A:
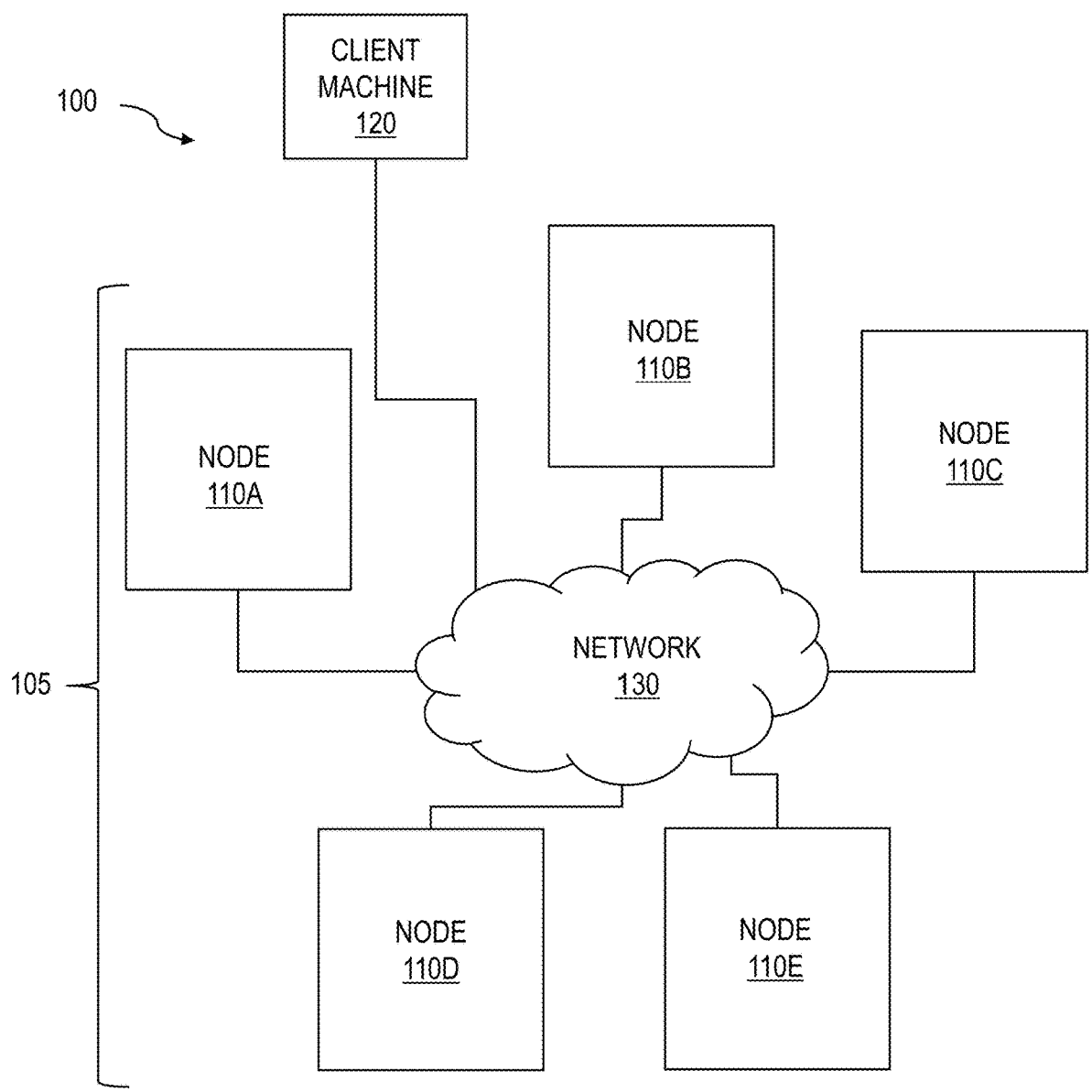
FIG. 1A depicts a system diagram illustrating an example of a distributed data storage system, in accordance with some example embodiments.

A distributed data storage system may store data across multiple computing nodes located across different racks, availability zones, data centers, and/or the like. Furthermore, the distributed data storage system may be configured to store data from multiple tenants, with data from each individual tenant being organized into one or more data partitions and stored in at least one data container. A single replica of a data partition may be stored in one of the computing nodes in the distributed data storage system. Accordingly, locating data within the distributed data storage system, for example, in order to respond to a query (e.g., a structured query language (SQL) statement and/or the like), may require identifying the data partition and/or the data container holding the data. Alternatively and/or additionally, locating data within the distributed data storage system may require identifying the data center, availability zone, rack, and/or computing node storing the data.

The distributed data storage system may implement transaction management in the form of a two-phase commit protocol that includes a transaction coordinator interacting with multiple participants in order to commit a transaction. For example, the transaction coordinator may send, to each participant, a call to prepare a commit of the transaction. When more than a threshold quantity of the participants vote to commit the transaction, the transaction coordinator may update a corresponding commit log record before informing all the participants to commit the transaction. Alternatively, if less than the threshold quantity of participants vote to commit the transaction, the transaction coordinator may inform the participants to abort the transaction. In the event a failover occurs at a participant subsequent to the preparation phase, that participant may still be able to obtain the outcome of the transaction from the transaction coordinator and commit (or abort) the transaction accordingly. Contrastingly, if a failover occurs at the transaction coordinator, the transaction may be aborted altogether because the data associated with the transaction at the transaction coordinator would be lost or corrupt. Thus, in this conventional paradigm for transaction management, the transaction coordinator may be a single point of failure and a bottleneck for transactional throughput.

The distributed data storage system may be a multi-tenant distributed data storage system in which data from a single tenant is stored in multiple redundant data partitions. These data partitions may be further distributed across multiple physical computing nodes in the storage layer of the distributed data storage system. Transactions on these data partitions may be managed using a variation of the two-phase commit protocol optimized for single-partition transactions. In order to increase transactional throughput of the system, the transaction coordinator may be linearly scaled out by partitioning the load across multiple transaction coordinator partitions. In addition to redundancy and high availability at runtime, enterprise-grade database systems may also require backup data and the ability to recover backup data to a specific point in time. For example, the distributed data storage system may be required to recover data from a database table. With a single transaction coordinator, recovery may be accomplished by backing up transaction coordinator state together with the state of individual data partitions. However, the same recovery task becomes much more complex with multiple, distributed transaction coordinators. Moreover, in an enterprise setting where the distributed data storage system is backed up in its entirety, recovery of even a single database table may consume significant computational resources.

In some example embodiments, to eliminate the single point of failure and the bottleneck for transactional throughput, the distributed data storage system may be configured to include multiple transaction coordinators. Each of the transaction coordinators and each of the participants may be configured to track the progress of transactions at the distributed data storage system. For example, transaction management at the distributed data storage system may be implemented by maintaining, for each transaction, a transaction control block at each of the transaction coordinators and at each of the participants. Moreover, each of the transaction coordinators and each of the participants may also maintain separate data structures tracking the status of aborted transactions within the distributed data storage system. In doing so, each participant may be able to recover pending transactions even in the event of a failover at one or more of the transaction coordinators. The distributed data storage system may also be configured to support backup and recovery on an individual partition level, thus providing more lightweight, efficient backup and recovery even when the distributed data storage system is implemented as a heavily distributed multi-tenant data storage system.

FIG. 1A depicts a system diagram illustrating an example of a distributed data storage system 100, in accordance with some example embodiments. Referring to FIG. 1A, the distributed data storage system 100 may include a cluster 105 of one or more physical computing nodes including, for example, a first node 110a, a second node 110b, a third node 110c, a fourth node 110d, a fifth node 110e, and/or the like. As shown in FIG. 1A, the first node 110a, the second node 110b, the third node 110c, the fourth node 110d, and the fifth node 110e may be communicatively coupled via a network 130. Moreover, one or more of the first node 110a, the second node 110b, the third node 110c, the fourth node 110d, and the fifth node 110e may be communicatively coupled with a client machine 120 via the network 130. The network 130 may be a wired network and/or a wireless network including, for example, a local area network (LAN), a virtual local area network (VLAN), a wide area network (WAN), a public land mobile network (PLMN), the Internet, and/or the like.

The first node 110a, the second node 110b, the third node 110c, the fourth node 110d, and the fifth node 110e may host one or more redundant data partitions. For example, each physical node in the cluster 105 may host a single replica of a data partition. The data partitions may provide storage functionalities such as, for example, a relational data store, a key value (K/V) store, and/or the like. According to some example embodiments, a subset of the data partitions may host a special store in order to implement the functionality of a transaction coordinator. Data held in the data partitions may be synchronized using a consensus protocol. Moreover, each data partition may be associated with a single transaction domain.

Figure 1B:
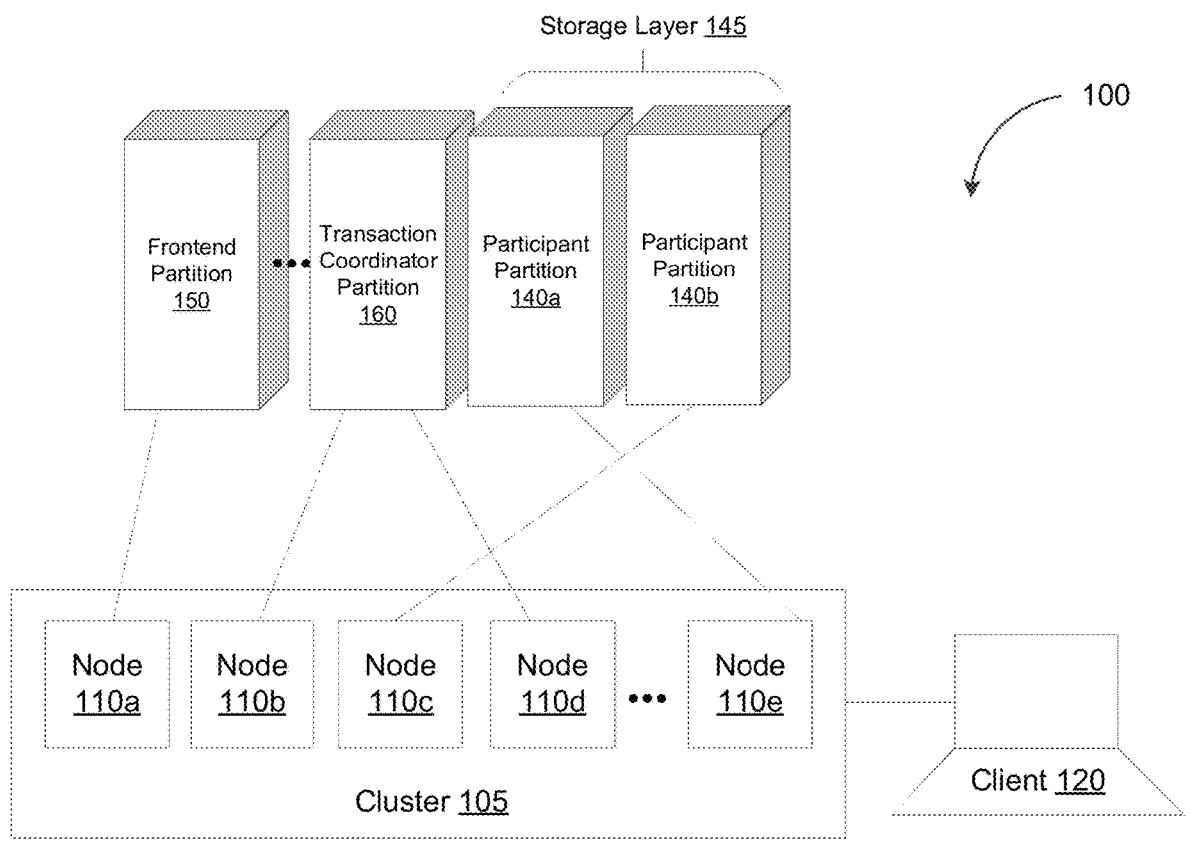
FIG. 1B depicts a schematic diagram illustrating an example of a distributed data storage system, in accordance with some example embodiments.

To further illustrate, FIG. 1B depicts a schematic diagram illustrating an example of the distributed data storage system 100, in accordance with some example embodiments. In some example embodiments, some data partitions, such as a first participant partition 140a and a second participant partition 140b, may provide persistent storage and may thus form the storage layer 145 of the distributed data storage system 100. It should be appreciated that replicas of the first participant partition 140a and the second participant partition 140b may be hosted on separate nodes within the cluster 105. Moreover, the distributed data storage system 100 may also include frontend data partitions, such as the frontend partition 150, hosting frontend drivers. The frontend data partitions may not provide any persistent storage but may nevertheless be replicated for redundancy. Referring again to FIGS. 1A-B, the client machine 120 may connect to the frontend partition 150, whose frontend driver may then drive transactions in the transaction coordinator partition 160 hosting the transaction coordinator coordinating the transaction, the first participant partition 140a and the second participant partition 140b participating in the transaction, between data partitions within the data storage system 100, which corresponds to detecting a communication failure between the physical nodes hosting the data partitions.

In some example embodiments, each open transaction within the distributed data storage system 100 may be represented by a transaction control block (TCB). Table 1 below depicts pseudo programming code implementing a transaction control block.

TABLE 1

```
struct TCB {
    PartitionID coordinator;
    PartitionID client;
    TransactionID transaction_id;
    TransactionState state;
    CommitID commit_id;
    unsigned int command_index;
    LSN start_lsn;
    struct {
        PartitionID id;
        unsigned int expected_command_index;
        LSN add_participant_lsn; // on coordinator only; LSN of ADD_PARTICIPANT log record
        bool start_written = false; // on coordinator only; flag to indicate START log record was durably written
    } participants[ ];
};
''' where:
    - PartitionID is a type used to uniquely address a partition (a unique address of a consensus domain in the system; possibly with only single replica for frontend)
    - coordinator is the ID of the transaction coordinator partition coordinating this particular transaction or empty if not a distributed transaction.
    - client is the ID of the frontend process on behalf of which the transaction is running.
    - transaction_id is a suitable system-wide unique ID identifying a transaction (for instance, a GUID).
    - state represents current state of the transaction (RUNNING, PREPARING, COMMITTING, COMMITTED, ABORTING, ABORTED).
    - commit_id is the ID set at the commit time for a committed transaction, which can be used to implement isolation in ACID. For instance, this can be a globally monotonically increasing ID given out by the sequencer of the transaction domain to implement MVCC. It is set during PREPARE state before writing COMMIT record.
    - command_index is the index of the command executed within a transaction. It is initialized with 1 and incremented after each processed command on behalf of the transaction.
    - start_lsn is the log sequence number of the log entry which started the transaction locally (maintained only on the participating data partition).
    - participants[ ] is the set of participants of this distributed transaction (maintained on the transaction coordinator and in the frontend, empty on participating data partitions).
    - participants[ ].id is the ID of the participating data partition.
    - participants[ ].expected_command_index is the expected command index for the part of the transaction on the respective participant (used for detecting data partition ROLLBACK due to network disconnect).
    - participants[ ].add_participant_lsn is log sequence number of the log entry which started the transaction on the respective participant.
``` and computation (e.g., SQL processing) on compute nodes on behalf of the client machine 120. The frontend partition 150 may be a part of a compute node process of the distributed data storage system 100 and be co-located with the compute node process on a corresponding compute node. Alternatively, the frontend partition 150 may be hosted on the same physical nodes as the storage layer (e.g., the first participant partition 140a, the second participant partition 140b, and/or the like) of the distributed data storage system 100.

The distributed data storage system 100 may further include a communication layer configured to detect connection failures within the cluster 105 of, for example, the first node 110a, the second node 110b, the third node 110c, the fourth node 110d, the fifth node 110e, and/or the like. Thus, instead of requiring heartbeat handling at each separate partition, the distributed data storage system 100 may provide a callback mechanism for detecting connection failure For a transaction within the distributed data storage system 100, a corresponding transaction control block (TCB) may be present at the frontend partition 150, the transaction coordinator partition 160 hosting the transaction coordinator that is coordinating the transaction, and the data partitions participating in the transaction such as the first participant partition 140a and the second participant partition 140b. Other than at the stateless frontend partition 150, which does not provide any persistent storage, a set of transaction control blocks may also be indirectly persisted and maintained implicitly by data manipulation language (DML) and data definition language (DDL) log entries and explicitly via transaction management log entries.

Table 2 below depicts the log entries maintained at the transaction coordinator partition 160.

TABLE 2

- ADD_PARTICIPANT transaction_id participant_id - starts or extends the distributed transaction
- COMMIT transaction_id commit_id - commits the distributed transaction
- ABORT transaction_id - aborts (rolls back) the distributed transaction
- CLEANUP transaction_id participant_id - removes a participant from a distributed transaction after rollback finished In addition to transaction control blocks, the transaction coordinator partition 160 may also maintain a persistent data structure with rolled back transactions (e.g., a coordinator rollback transaction table (CRTT)). Upon aborting a transaction, the transaction coordinator (e.g., hosted at the transaction coordinator partition 160) may add, to this data structure, a corresponding entry. That entry may be kept in the data structure until confirmation that the transaction has also been aborted at the participants associated with the transaction, such as the participants hosted at the first participant partition 140a and the second participant partition 140b. Accordingly, an entry may be added to the data structure when an ABORT indication is received for a transaction and removed from the data structure when a CLEANUP indication is received from all participants (e.g., when participant list of the transaction becomes empty). As such, for each transaction that is being rolled back (e.g., for each rolled back transaction ID), the data structure may include a list of corresponding participants. Table 3 below depicts pseudo programming code implementing an entry in the data structure, for example, the coordinator rollback transaction table (CRTT).

TABLE 3

```
struct CRTTEntry {
    TransactionI id;
    PartitionID participants[ ];
}
```

Table 4 below depicts the log entries maintained at a participating data partition such as, for example, the first participant partition 140a, the second participant partition 140b, and/or the like.

TABLE 4

- Log entries of the transaction, all of them marked with transaction_id of the transaction - implicitly start a local transaction, if new transaction ID is found
- START transaction_id transaction_manager_id - marks the local transaction as being part of a distributed transaction managed by transaction coordinator with ID transaction_manager_id
- PREPARE transaction_id - prepare the transaction to commit
- COMMIT transaction_id commit_id - commit a prepared distributed transaction part or commit a local transaction
- ABORT transaction_id - abort a transaction In addition to transaction control blocks, each participating data partition, for example, the first participant partition 140a and the second participant partition 140b, may also maintain a persistent data structure with rolled back transactions (e.g., a rollback transaction table (RTT)). This data structure may contain all in-progress rollbacks in the data partition, which require further confirmation at the transaction coordinator. Upon aborting a transaction, for example, in response to writing an ABORT log entry, a corresponding entry may be added to the data structure. The entry may be removed from the data structure once the rollback of the transaction is complete and a CLEANUP indication is sent to the transaction coordinator (e.g., hosted at the transaction coordinator partition 160). Table 5 depicts pseudo programming code implementing an entry in the data structure, for example, the rollback transaction table (RTT).

TABLE 5

```
struct RTTEntry {
    TransactionManagerID coordinator;
    TransactionID id;
};
```

In some example embodiments, the transaction coordinators and the participating data partitions may maintain separate data structures (e.g., the coordinator rollback transaction table (CRTT) and the rollback transaction table (RTT)) to track aborted transactions at the distributed data storage system 100. Contrastingly, there may not be a need to maintain a table for tracking committed transactions at least because the default action for a transaction is to commit (e.g., known as "presumed commit"). Accordingly, once the transaction control block (TCB) of a transaction is removed from the transaction coordinator (e.g., the transaction coordinator partition 160), the transaction is considered committed.

The transaction coordinator partition 150 and each of the first participant partition 140a and the second participant partition 140b may back up their logs independently, for example, after a log segment is full, after a certain amount of time has passed, and/or the like. Each log segment backup may be associated with a timestamp of the last committed transaction in the log segment. Furthermore, the transaction coordinator partition 150 and each of the first participant partition 140a and the second participant partition 140b may perform periodic snapshot backups. This may again occur in a non-coordinated fashion, with each partition performing the snapshot backup at its own pace. The snapshot backup of a partition, which may capture the state of the partition at a particular point in time, may be associated with a transaction timestamp taken at the time of the snapshot or the timestamp of the last committed transaction in the snapshot. According to some example embodiments, all backup data may be redundantly stored on backup storage and be available on-demand for recovery of lost data. The retention period, or the length of time data is held in backup, may be defined based on recovery requirements. It should be appreciated that it may not be possible to recover data outside of the retention period.

Partition-level backup may enable the recovery of a tenant database in a multi-tenant distributed data storage system with less resource overhead (e.g., disk, random access memory (RAM), central processing unit (CPU) and/or the like). The distributed data storage system 100 may also support point-in-time recovery of any subset of data (e.g., obtain a copy of a deleted database table and/or the like), which may be a non-destructive task that is also faster to accomplish than traditional recoveries of an entire database. As used herein, the term "recovery" may refer to the extraction of data for a variety of purposes including, for example, the creation of a transactionally-consistent tenant copy of a master database, the replacement of damaged data, the recovery of lost data, and/or the like. The term "point-in-time recovery" may refer to the recovery of data from a certain point in time in the past specified, for example, by a user. It should be appreciated that point-in-time recovery may be performed in a variety of context, not just in the event of data corruption or loss (e.g., a failover, an inadvertent deletion, and/or the like). The ability to recover only a subset of data may reduce the data transfer costs associated with a partial recovery. When combined with parallelization in a large multi-tenant distributed data storage system, the recovery of an entire tenant database may be accomplished quickly on when performed in parallel across multiple nodes in the distributed data storage system 100.

In some example embodiments, the frontend partition 150 at the distributed data storage system 100 may respond to a transaction (e.g., a write request to insert, delete, or modify a record) by starting the transaction as a local transaction. For example, a frontend driver hosted at the frontend partition 150 may generate a transaction identifier for the transaction. Furthermore, the frontend driver may create, at the frontend partition 150, a transient transaction control block (TCB) with an empty transaction coordinator in a RUNNING state and a single participant data partition corresponding to the data partition affected by the transaction. This transient transaction control block may be used to track the participating data partitions as well as to transition between local transactions and distributed transactions. Each transaction may include a series of operations that require multiple communications with the corresponding data partition. Thus, to execute a transaction, the frontend driver may send, to the data partition, the individual operations that are to be performed as part of the transaction. For instance, the frontend driver hosted at the frontend partition 150 may send the transaction (e.g., the write request to insert, delete, or modify a record) to the first participant partition 140*a* participating in the transaction.

Upon receiving the transaction (e.g., the write request to insert, delete, or modify a record), the participating data partition, such as the first participant partition 140*a*, may create a corresponding transaction control block (TCB) in a RUNNING state for the transaction with an empty TCB-.start_lsn field and the TCB.client field set to the identifier of the frontend driver (e.g., the frontend partition 150 hosting the frontend driver). Additional transactions (e.g., write requests) affecting the same data partition may not change the transactional control block, except to increment the TCB.command_index.

Figure 2A:
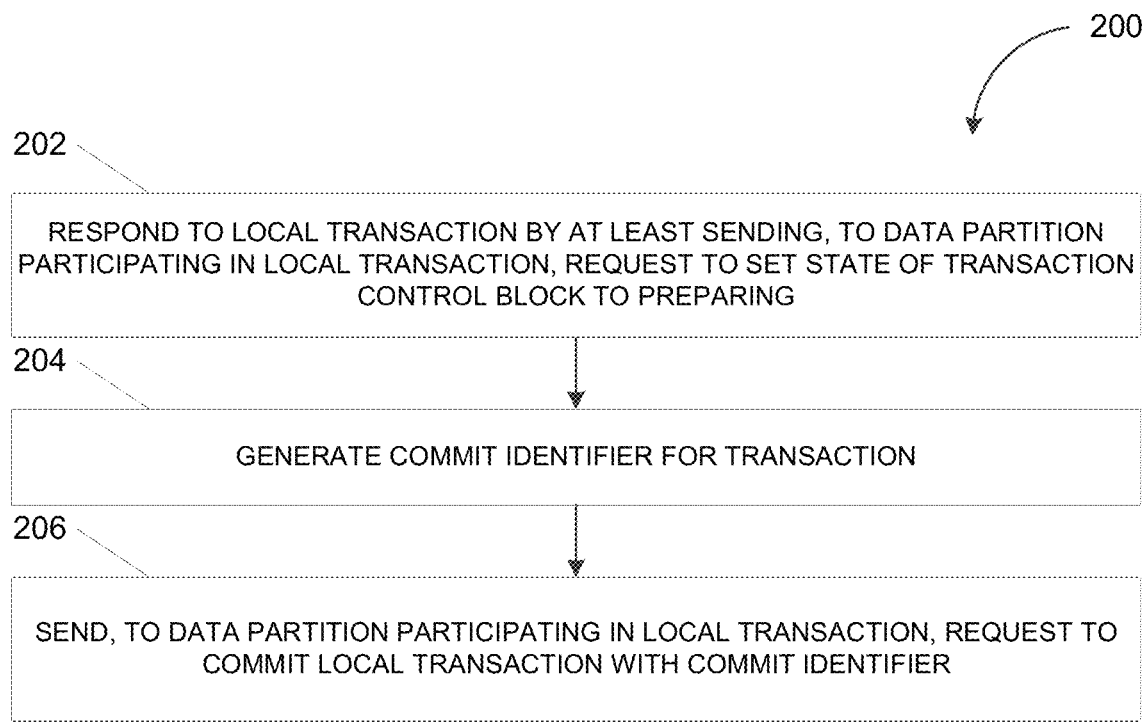
FIG. 2A depicts a flowchart illustrating an example of a process for committing a local transaction at a frontend partition, in accordance with some example embodiments.

The frontend driver hosted at the frontend partition 150 may commit a local transaction affecting a single data partition. FIG. 2A depicts a flowchart illustrating an example of a process 200 for committing a local transaction at a frontend partition, in accordance with some example embodiments. At 202, the frontend driver may respond to a transaction by sending, to the data partition, a request to set TCB.state to PREPARING state and wait until the transaction control block is marked as PREPARING. This communication operation may be performed to ensure that the transaction is marked as in the process of being committed and thus may not require any logging. At 204, the frontend driver may generate a commit identifier for the transaction. For example, the frontend driver may request the commit identifier for the transaction from a sequencer in the event data visibility at the distributed data storage system 100 is subject to a multi-version currency control (MVCC) protocol. It should be appreciated the frontend driver may request the commit identifier after the transaction control block (TCB) of the transaction has been set to the PREPARING state at least because visibility checks may require the resolution of the transaction. If performed out of order, the visibility check may erroneously determine that the transaction is still in progress when the transaction has in fact been committed and miss data as a result. At 206, the frontend driver may send, to the data partition, a request to commit the transaction with the commit identifier.

Figure 2B:
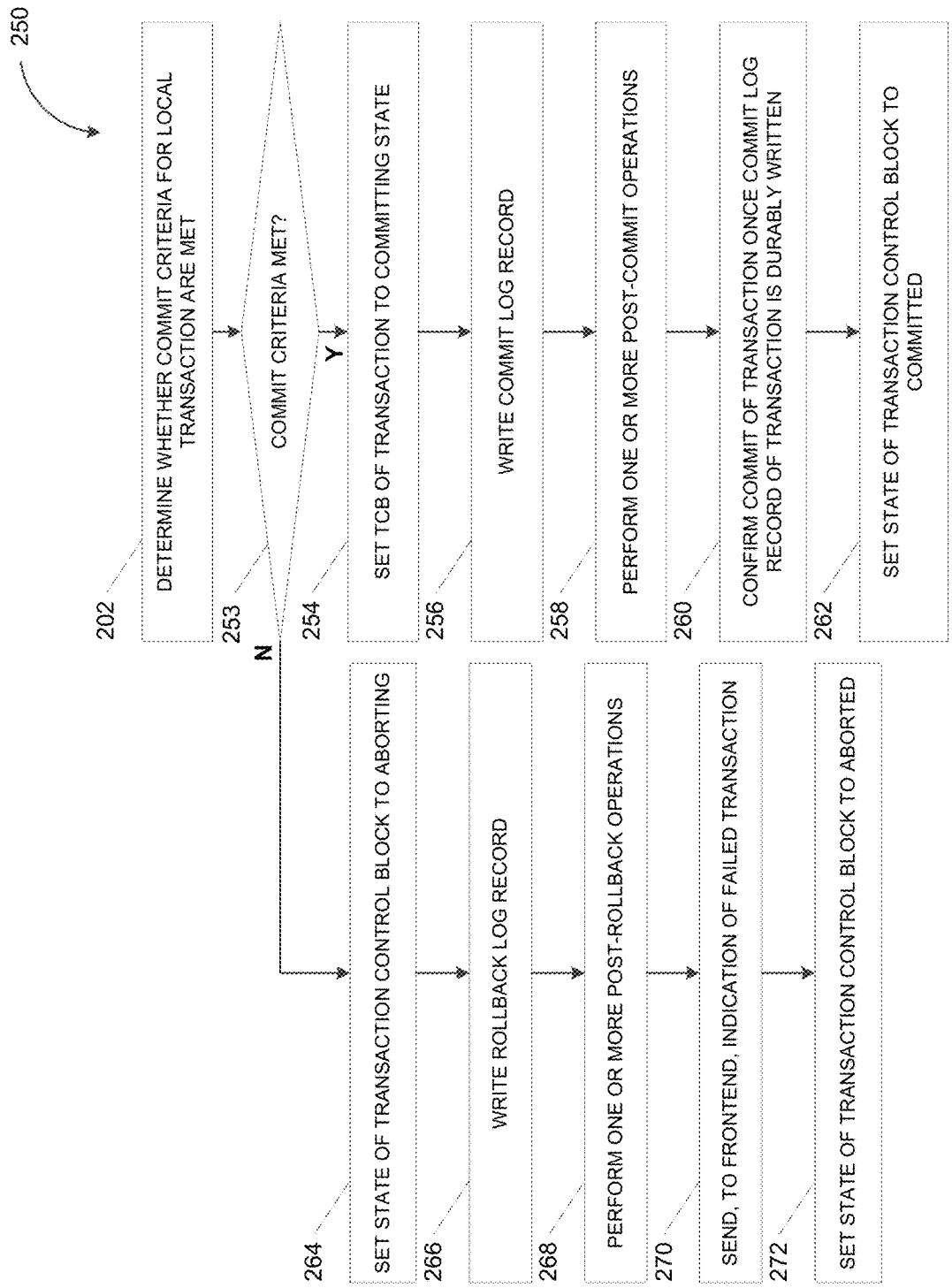
FIG. 2B depicts a flowchart illustrating an example of a process for committing a local transaction at a participating data partition, in accordance with some example embodiments.

In some example embodiments, the frontend driver (e.g., hosted at the frontend partition 150) may interact with a participating data partition, such as the first participant partition 140*a*, to commit a local transaction affecting a single data partition. FIG. 2B depicts a flowchart illustrating an example of a process 250 for committing a local transaction at a participating data partition, in accordance with some example embodiments. At 252, the data partition may determine whether one or more commit criteria for a local transaction are met. For example, the first participant partition 140*a*, which may be the single data partition affected by the transaction, may determine whether there are conflicts associated with the transaction. At 253-Y, the data partition may determine that the commit criteria for the transaction have been met. As such, at 254, the data partition may set the transaction control block to indicate that the transaction is being committed. For example, the first participant partition 140*a* may set the corresponding transaction control block (TCB) at the first participant partition 140*a* including by setting a commit identifier of the transaction (e.g., TCB-.commit_id) and the state of the transaction control block (e.g., TCB.state) to COMMITTING. In doing so, the transaction may be considered committed for purposes of visibility checks (e.g., when applying the multi-version concurrency control (MVCC) protocol).

At 256, the data partition may write a COMMIT log entry at the data partition. For example, the first participant partition 140*a* may write a COMMIT log record into a commit log at the first participant partition 140*a*. At 258, the data partition may perform one or more post-commit operations. Furthermore, at 260, the data partition may confirm the commit once a COMMIT log record associated with the transaction is durably written. At 262, the data partition may set the state of the transaction control block to COMMITTED. In doing so, the first participant partition 140*a* may enable the garbage collection of the transaction control block.

Alternatively, at 253-N, the data partition may determine that the commit criteria for the transaction have been met. Accordingly, at 264, the data partition may set the state of the transaction control block to ABORTING. In doing so, the transaction may be considered aborted for purposes of visibility check. At 266, the data partition may write ROLLBACK log record. This update may occur with delayed durability. At 268, the data partition may start a background process to perform one or more post-rollback operations. At 270, the data partition may send, to the frontend partition, an indication that the transaction has failed. For instance, the first participant partition 140*a* may send, to the frontend partition 150, an indication of a failure of the transaction. At 272, the data partition may set the state of the transaction control block to ABORTED. By setting the state of the transaction control block (e.g., TCB.state) to ABORTED, the first participant partition 140*a* may enable the garbage collection of the transaction control block.

Figure 3A:
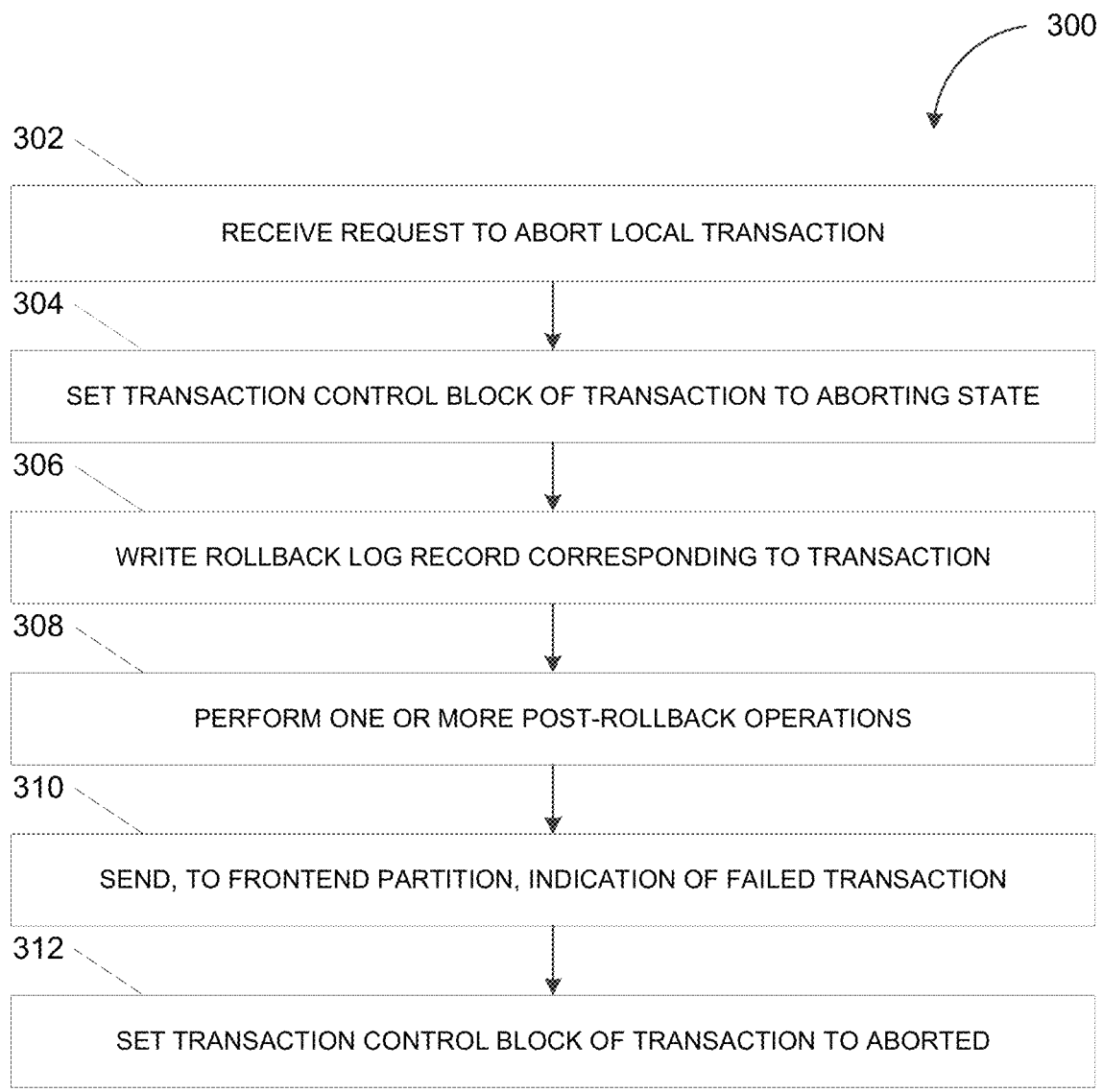
FIG. 3A depicts a flowchart illustrating an example of a process for rolling back a local transaction at a participating data partition, in accordance with some example embodiments.

In some cases, the decision to rollback a local transaction affecting a single data partition may occur at the frontend partition. When that happens, the frontend driver hosted, for example, at the frontend partition 150, may send a request to abort the transaction to the data partition (e.g., the first participant partition 140*a*) affected by the transaction. FIG. 3A depicts a flowchart illustrating an example of a process 300 for rolling back a local transaction at a participating data partition, in accordance with some example embodiments. At 302, the data partition may receive a request to abort a transaction. For example, the first participant partition 140*a* may receive, from the frontend partition 150 hosting a frontend driver, a request to abort a local transaction affecting the first participant partition 140*a*. At 304, the data partition may respond to the request by setting a state of a transaction control block to ABORTING. For instance, upon receiving the request from the frontend partition 150, the first participant partition 140*a* may set the state of the transaction control block (e.g., TCB.state) to ABORTING.

At 306, the data partition may write a ROLLBACK log record corresponding to the aborted transaction. Moreover, at 308, the data partition may start a background process to perform one or more post-rollback operations. At 310, the data partition may send, to the frontend partition, an indication that the transaction has failed. For instance, the first participant partition 140*a* may send, to the frontend partition 150, an indication of a failure of the transaction. At 312, the data partition may set the state of the transaction control block to ABORTED. By setting the state of the transaction control block (e.g., TCB.state) to ABORTED, the first participant partition 140*a* may enable the garbage collection of the transaction control block.

In the event of a failover at a data partition, a recovery process may be performed once the data partition restarts. Recovery at an individual data partition, such as the first participant partition 140*a* and the second participant partition 140*b*, may be performed based on log entries included in the new transaction log, commit log, and rollback log maintained at each partition. In some example embodiments, different processes may be performed to handle local transactions affecting a single data partition (e.g., TCB.coordinator is empty) and for distributed transactions affecting multiple data partitions.

For a local transaction that is yet to be committed, the local transaction may be associated with a log record with a new transaction identifier. Recovery of such a local transaction may include the data partition creating a corresponding transaction control block (TCB) in a RUNNING state but without any transaction coordinators (e.g., TCB.coordinator is empty). Alternatively, a local transaction that has been committed may be associated with a commit log entry and a transaction control block with an empty transaction coordinator list. For a committed local transaction, the data partition may set the state of the transaction control block to COMMITTING as well as the commit identifier (e.g., TCB.commit_id) to the identifier found in the COMMIT log record. The data partition may also initiate background processes to perform one or more post-commit operations before setting the state of the transaction control block (e.g., TCB_state) to COMMITTED, which may enable the garbage collection of the transaction control block.

An aborted transaction may be associated with a rollback log entry and a transaction control block (TCB) with an empty transaction coordinator list. To recover the aborted transaction, the data partition may set the state of the transaction control block to ABORTING. Moreover, the data partition may initiate background processes to perform one or more post-rollback operations. Once the post-rollback operations are complete, the data partition may set the state of the transaction control block to ABORTED, thereby enabling the garbage collection of the transaction control block.

In the event a recovery process starts from a particular snapshot of the state of the distributed data storage system 100 at a particular point in time, the data partition may load the state of the local transaction manager at snapshot time. This may include one or more open transaction control blocks, which are in a COMMITTING state or an ABORTING state. For transaction control blocks in a COMMITTING state or an ABORTING state, the respective background processes for post-commit or post-rollback operations may be resumed. Once those background processes are complete, the data partition may set the state of the corresponding transaction control blocks (e.g., TCB.state) to COMMITTED or to ABORTED in order to permit subsequent garbage collection.

Figure 3B:
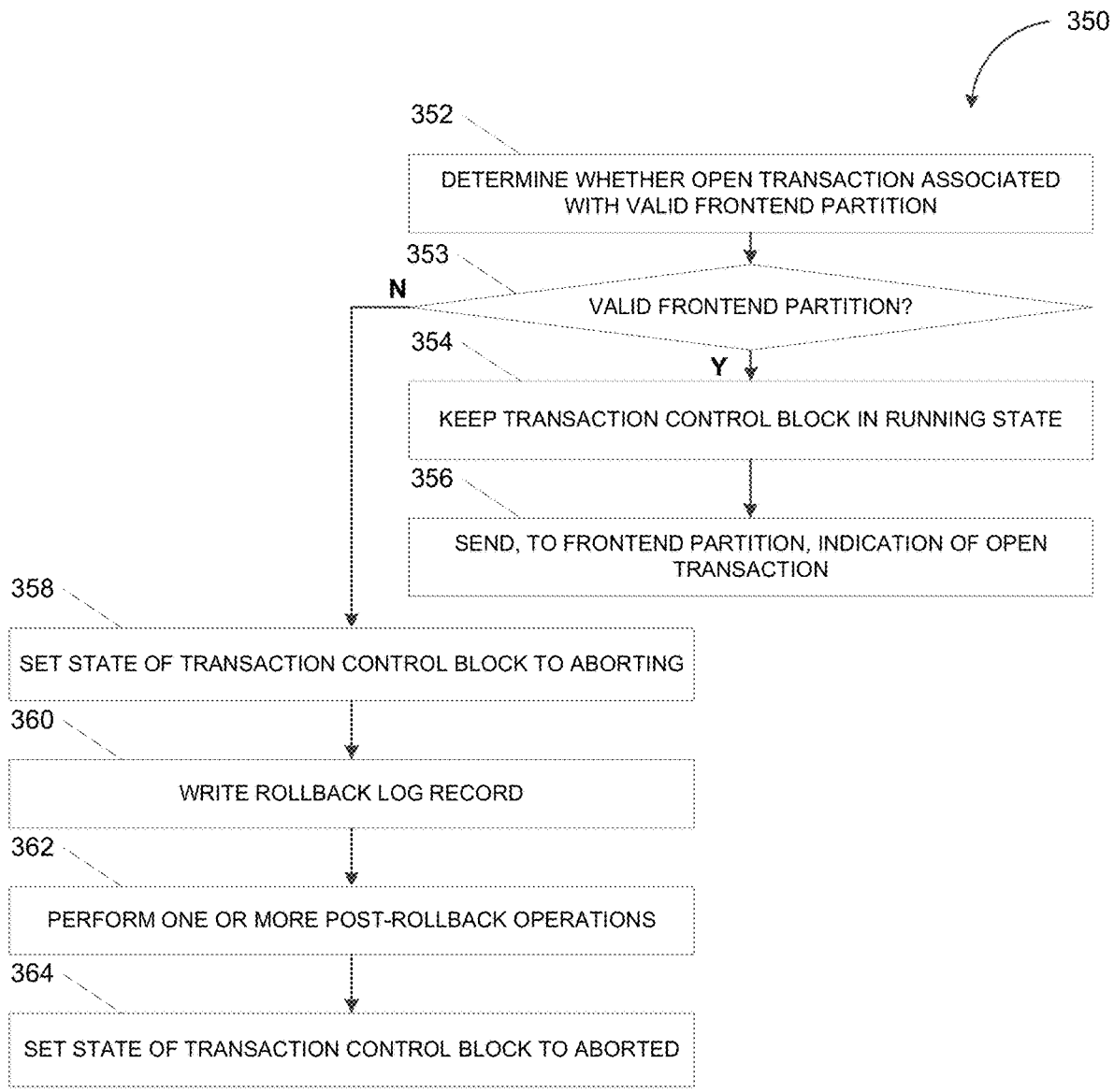
FIG. 3B depicts a flowchart illustrating an example of a process for handling post-recovery open local transactions, in accordance with some example embodiments.

Some transactions may remain open at the data partition upon completion of the recovery process. For example, the data partition may detect open transactions based on the presence of transaction control blocks in a RUNNING state. FIG. 3B depicts a flowchart illustrating an example of a process 350 for handling post-recovery open local transactions, in accordance with some example embodiments. At 352, the data partition may determine whether a transaction control block in a RUNNING state points to a valid frontend partition. At 353-Y, the data partition may determine that the transaction control block points to a valid frontend partition. For example, the first participant partition 140*a* may determine that the transaction control block of an open transaction still points to the valid frontend partition 150. As such, at 354, the data partition may keep the transaction control block in the RUNNING state.

Moreover, at 356, the data partition may send, to the frontend partition, an indication of the open transaction. Upon receiving the indication from the first participant partition 140*a* of the open transaction, for example, the frontend driver at the frontend partition 150 may determine whether a transaction control block for the transaction exists at the frontend partition 150. If the transaction control block for the transaction no longer exists at the frontend partition 150, the frontend driver at the frontend partition 150 may request to ROLLBACK the transaction.

Alternatively, at 353-N, the data partition may determine that the frontend partition no longer exists. When that is the case, at 358, the data partition may set the state of the transaction control block to ABORTING. For example, when the frontend partition 150 of an open transaction no longer exists, the first participant partition 140*a* may change the state of the corresponding transaction control block (e.g. TCB.state) from RUNNING to ABORTED to rollback the transaction. Moreover, at 360, the data partition may write a ROLLBACK log entry corresponding to the transaction. At 362, the data partition may initiate background processes to perform one or more post-rollback operations. Once the post-rollback operations are complete, at 364, the data partition may set the state of the transaction control block to ABORTED. As noted, changing the state of a transaction control block to ABORTED may enable a subsequent garbage collection of the transaction control block.

In some example embodiments, the frontend driver associated with a transaction, such as the frontend driver hosted at the frontend partition 150, may be the owner of the transaction. The frontend driver may be a redundant transient component that is capable of recovering from failures of a simple, solitary component. However, if the frontend is a simple, solitary component or if all replicas of the frontend driver fail, then the transaction may be left in a RUNNING state in the one or more data partitions participating in the transaction. Such frontend failures may be handled by implementing a modified consensus protocol that operates without heartbeat network traffic. For example, when a data partition detects a new transaction (e.g., when a transaction control block (TCB) for the transaction is created) or when the data partition reconnects to the frontend partition, the data partition may set up a callback to handle faulty connections to the frontend partition (e.g., the TCB.client). A faulty connection detected by the connection layer may either arise from a failover at the frontend partition or behind a network partition. The connection layer may attempt to reestablish the connection between the frontend partition and the data partition such that the connection state may remain unaffected if a new leader is reelected at the data partition or the frontend partition. Nevertheless, if the connection between the frontend partition and the data partition fails and cannot be reestablished, the transaction cannot continue and is therefore rolled back with the frontend driver at the frontend partition issuing a ROLLBACK request. The frontend partition may also register a callback to handle faulty connections. For instance, in the case the frontend partition detects a faulty connection, the frontend driver may remove the transaction control blocks of local transactions from the frontend partition and notify the client about failed transaction.

Due to asynchronous nature of the error detection protocol, the frontend partition may be unaware of the faulty connection while the data partition has already rolled back the affected transaction. When the frontend partition later sends a new command for this transaction, the data partition may mistakenly treat this command as a new transaction. This error may be detected at the frontend partition by comparing the expected command index returned by the data partition for this transaction. If the current index is greater than the previous index, then there was no rolled back transaction. Contrastingly, if the index is suddenly back to 1, then there was a rollback and a transaction that no longer exists. In this scenario, the frontend partition may send a ROLLBACK request to the data partition and abort the transaction. The same command index may also be used for PREPARE requests when handling distributed transactions that affect multiple data partitions.

As noted, local transactions and distributed transactions at the distributed data storage system 100 may be handled differently. Nevertheless, a distributed transaction may start as a local transaction and is upgraded to a distributed transaction when the need arises to write to more than one data partition. As used herein, the term "write" is used broadly to encompass, for example, a lock in a two-phase locking (2PL) protocol to ensure serializable isolation in some variation of data visibility protocol.

Figure 4A:
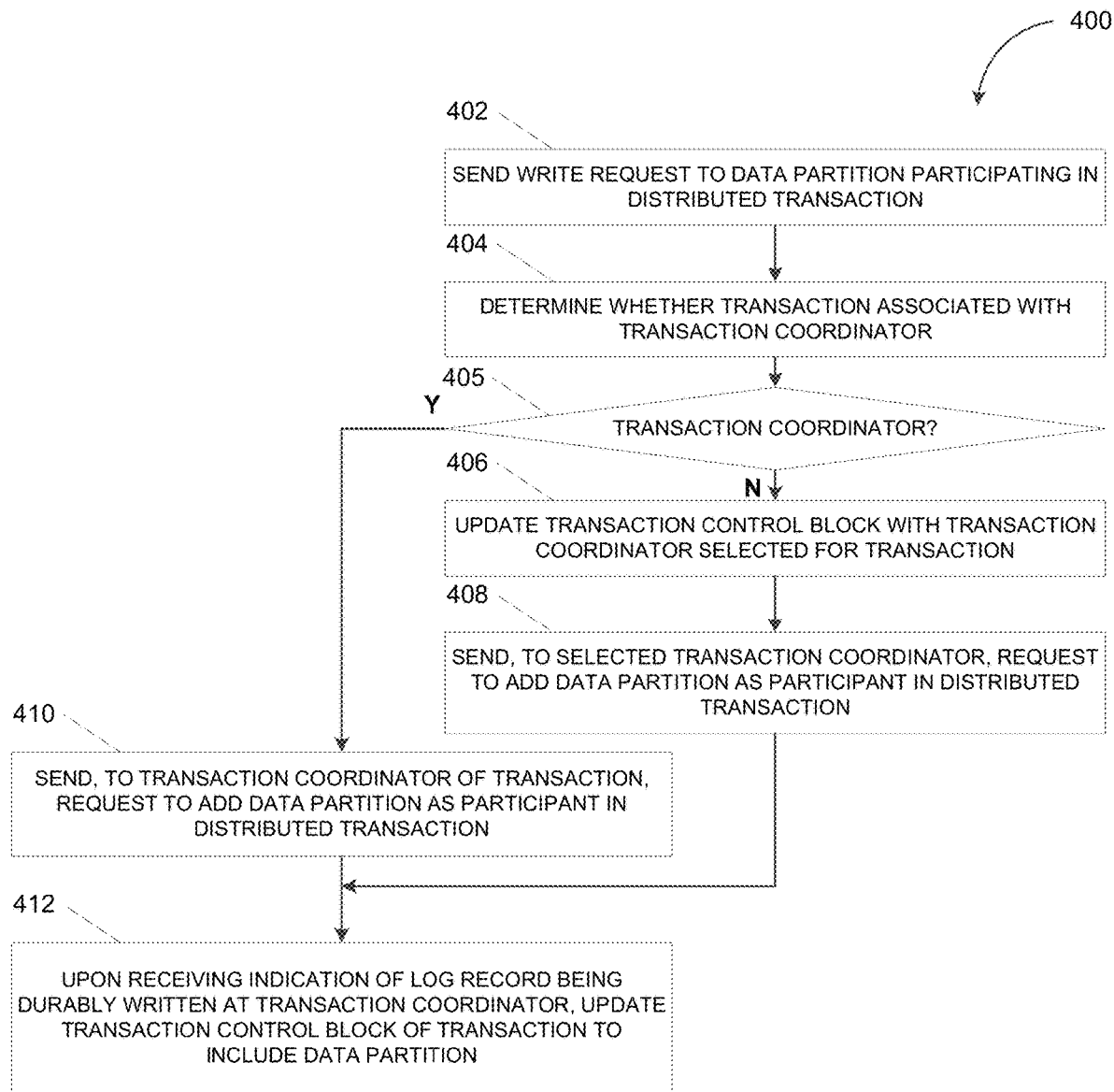
FIG. 4A depicts a flowchart illustrating an example of a process for handling a distributed transaction at a frontend partition, in accordance with some example embodiments.

FIG. 4A depicts a flowchart illustrating an example of a process 400 for handling a distributed transaction at a frontend partition, in accordance with some example embodiments. For example, the process 400 may be performed by the frontend driver at the frontend partition 150 when sending a write request to a data partition, such as the first participant partition 140a, that is not yet in the participant list of the transaction control block associated with the transaction. At 402, the frontend driver may send a request to a data partition participating in a distributed transaction. At 404, the frontend driver may determine whether the transaction is already associated with a transaction coordinator. For example, the frontend driver at the frontend partition 150 may determine whether a distributed transaction is associated with a transaction coordinator based on the coordinator list (e.g., TCB.coordinator) in the transaction control block of the transaction.

At 405-N, the frontend driver may determine that the transaction is not associated with a transaction coordinator. For example, the coordinator list in the transaction control block (TCB) of the transaction may be empty, in which case the frontend driver at the frontend partition 150 may determine that the distributed transaction is not already associated with a transaction coordinator. At 406, the frontend driver may update the transaction control block of the distributed transaction with a transaction coordinator selected for the distributed transaction. Although the frontend driver may select any existing transaction coordinator, the frontend driver may ideally select a transaction coordinator that is co-located with one of the data partitions participating in the transaction. At 408, the frontend driver may send, to the selected transaction coordinator, a request to add the data partitions as participants in the distributed transaction. For example, the frontend driver at the frontend partition 150 may send, to the transaction coordinator hosted at the transaction coordinator partition 160, a request to write ADD_PARTICIPANT log entries to create a distributed transaction involving the first participant partition 140a and the second participant partition 140b. The transaction coordinator at the transaction coordinator partition 160 may return the log sequence numbers (LSNs) of the ADD_PARTICIPANT log records.

At 405-Y, the frontend driver may determine that the transaction is associated with a transaction coordinator. For example, the transaction may already be distributed if the coordinator list (e.g., TCB.coordinator) in the transaction control block of the transaction is not empty. Thus, at 410, the frontend driver may send, to the transaction coordinator, a request to add the data partition as a participant in the distributed transaction and return the log sequence number of the corresponding log record. At 412, the frontend driver may, upon receiving an indication that the log record has been durably written at the transaction coordinator, update the transaction control block of the transaction to include the data partition as a participant in the transaction.

Figure 4B:
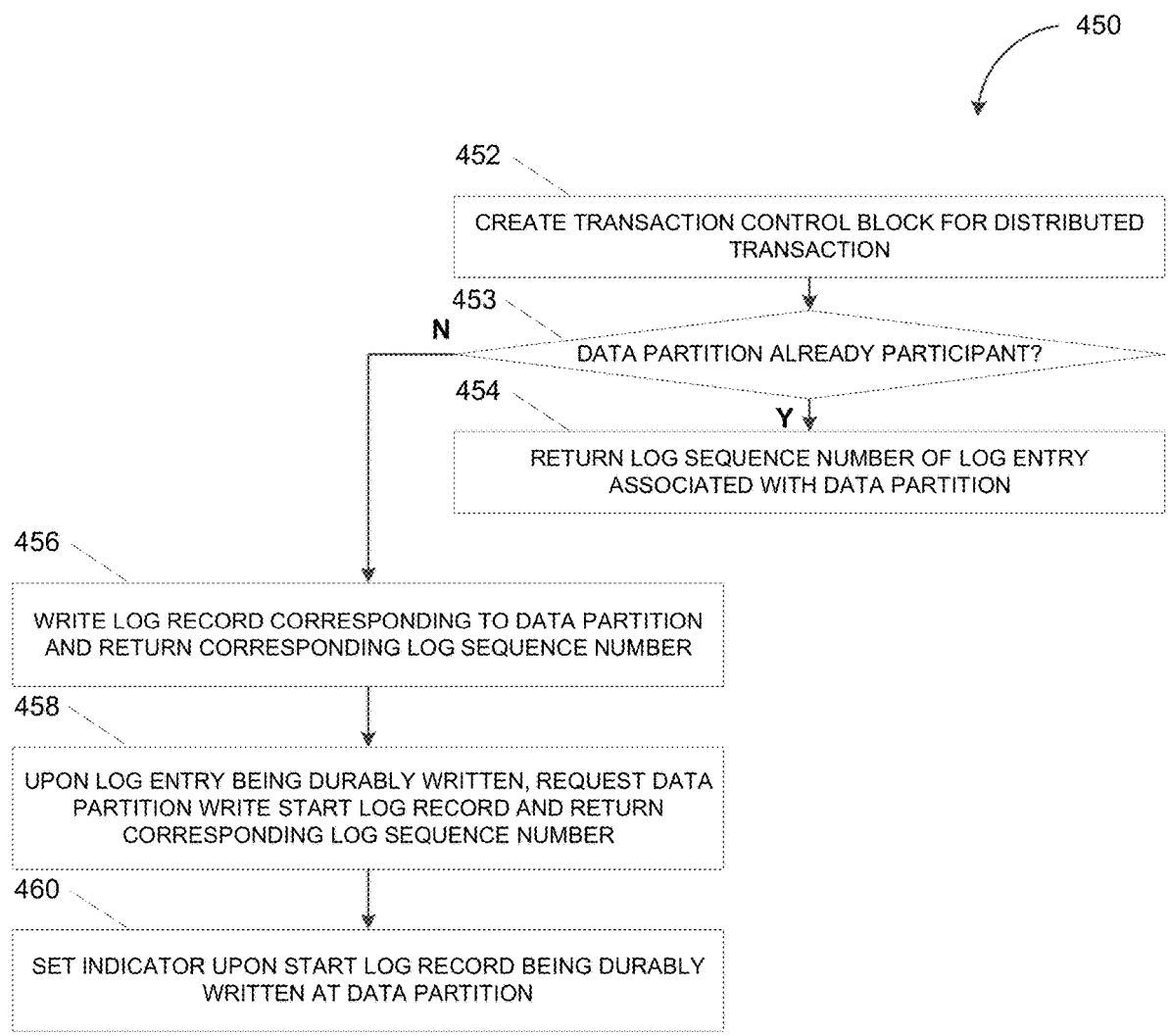
FIG. 4B depicts a flowchart illustrating an example of a process for handling a distributed transaction at a transaction coordinator, in accordance with some example embodiments.

FIG. 4B depicts a flowchart illustrating an example of a process 450 for handling a distributed transaction at a transaction coordinator, in accordance with some example embodiments. For example, the transaction coordinator hosted at the transaction coordinator partition 160 may perform the process 450 to handle a transaction that with multiple participating data partitions such as the first participant partition 140a and the second participant partition 140b. At 452, in response to a request to add a data partition as a participant of a distributed transaction, the transaction coordinator may create a transaction control block for a transaction if no transaction control block for the transaction is present at the transaction coordinator partition. For instance, if the transaction coordinator at the transaction coordinator partition 160 is unable to locate a transaction control block with a given transaction identifier, the transaction coordinator may create a new transaction control block (TCB) in a RUNNING state and with the identifier of the client (e.g., TCB.client) set to the identifier of the frontend partition 150. A callback may also be registered to enable frontend failure handling.

At 453, the transaction coordinator may determine whether the participant list in the transaction control block of the transaction already includes the data partition. At 453-Y, the transaction coordinator may determine that the data partition is already included in the participant list in the transaction control block of the transaction. For example, this may happen if the transaction coordinator at the transaction coordinator partition 160 is receiving a redundant call as a result of a recovery at the frontend partition 150. Thus, at 454, the transaction coordinator may return the log sequence number of the log entry associated with the data partition. For instance, the transaction coordinator may return the TCB.participants[ ].start_lsn.

Alternatively, at 453-N, the transaction coordinator may determine that the data partition is not already part of the participant list in the transaction control block of the transaction. As such, at 456, the transaction coordinator may write a log record associated with the data partition as a participant of the transaction and return a corresponding log sequence number. For example, the transaction coordinator may create a ADD_PARTICIPANT log record and add the new participant and log sequence number of ADD_PARTICIPANT log record into participant list (e.g., TCB.participants[ ]) in the transaction control block of the transaction. Doing so may ensure that the transaction is known to the transaction coordinator, with the transaction coordinator being responsible for deciding the outcome of the transaction. At 458, once the participant log entry is durably written, the transaction coordinator may request that the data partition write a START log record and return the corresponding log sequence number. The data partition may be required to return, possibly as part of another communication, the log sequence number of the START log record. The log sequence number of the START log record may be stored locally at the data partition, for example, in the corresponding transaction control block (e.g., TCB.start_lsn) for recovery purposes. At 460, once the START log record is durably written at the participating data partition, the transaction coordinator may set a corresponding indicator. For instance, the data partition may set the respective TCB.participants[ ]._start_written to TRUE. While waiting for confirmation that the participant log entry has been durably written, the transaction coordinator may return the log sequence number TCB.participants[ ].start_lsn.

Figure 4C:
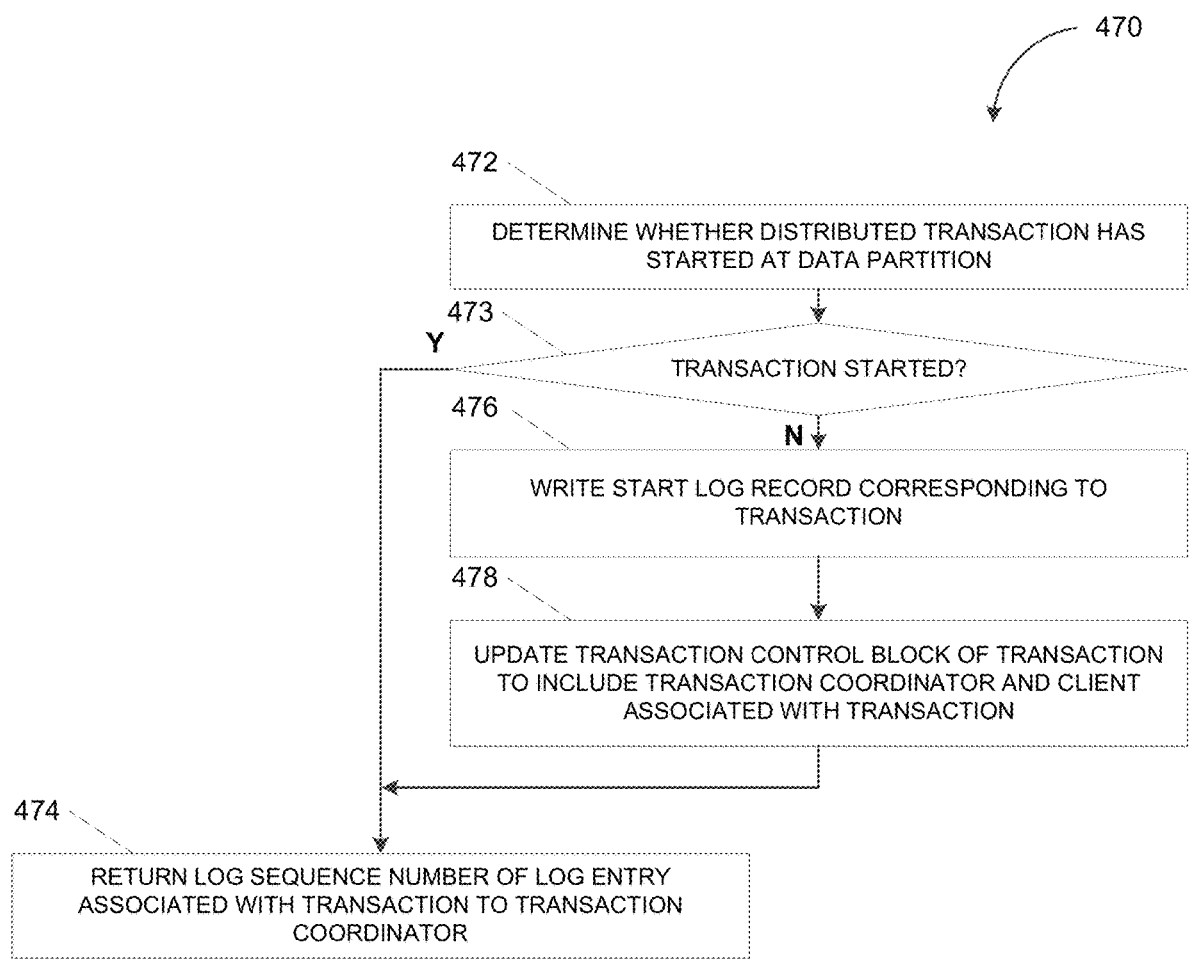
FIG. 4C depicts a flowchart illustrating an example of a process for handling a distributed transaction at a participating data partition, in accordance with some example embodiments.

FIG. 4C depicts a flowchart illustrating an example of a process 470 for handling a distributed transaction at a participating data partition, in accordance with some example embodiments. For example, the process 470 may be performed at each of the first participant partition 140a and the second participant partition 140b participating in a distributed transaction driven by the frontend driver at the frontend partition 150 and coordinated by the transaction coordinator at the transaction coordinator partition 160.

At 472, the data partition may determine whether a distributed transaction has already started. At 473-Y, the data partition may determine that a distributed transaction has already started at the data partition. For example, if the TCB.start_lsn in the transaction control block of the distributed transaction is already set, the call may be a redundant call arising from a recovery or a leader change in the transaction coordinator consensus domain. At 474, the data partition may return the TCB.start_lsn to the transaction coordinator associated with the transaction.

Alternatively, at 473-N, the data partition may determine that a distributed transaction has not already started at the data partition. As such, at 476, the data partition may write a START log record corresponding to the transaction. Moreover, at 478, the data partition may update the transaction control block of the transaction to include the transaction coordinator and client associated with the transaction. For example, the transaction control block of the distributed transaction may be updated to include the identifiers of the transaction coordinator (e.g., TCB.coordinator) and the frontend driver (e.g., TCB.client). The data partition may also re-register communication failure handling callback from the original client (e.g., the frontend driver) to the transaction coordinator. The process 470 may then resume at operation 474 where the data partition returns the log sequence number TCB.start_lsn to the transaction coordinator.

In some example embodiments, the rollback of a distributed transaction may be initiated when the frontend driver communicates an explicit rollback request to the transaction coordinator or when the transaction coordinator detects a failover at the frontend driver. In either case, the transaction coordinator may set the transaction control block of the transaction to an ABORTED state and write an ABORT log entry, for example, in the coordinator rollback transaction table (CRTT). The transaction coordinator may further send rollback request to each of the data partitions participating in the distributed transaction.

Meanwhile, in response to a request from the transaction coordinator to rollback a transaction coordinator, each participating data partition may, if the transaction control block of the transaction still exists at the data partition, set the state of the transaction control block to ABORTING and write an ABORT log entry into a corresponding rollback transaction table (RTT). Each data partition may also start background process to perform any post-rollback operations before setting the transaction control block to an ABORTED state (e.g., to render the transaction control block eligible for garbage collection). The transaction identifier and the identifier of the transaction coordinator may be stored in the rollback transaction table (RTT). When the ABORT log entry is durably written or if the transaction control block did not exists to begin with, the data partition may send, to the transaction coordinator, a request to remove the data partition as a participant of the transaction (e.g., to remove the data partition using a CLEANUP log entry). Once the transaction coordinator confirms the cleanup (e.g., durably written at the transaction coordinator), the data partition may remove the transaction from the rollback transaction table (RTT).

In the event a failover occurs at the data partition before cleanup is complete and confirmed, a restart at the data partition may trigger another attempt to clean up the entries in the rollback transaction table (RTT) of the data partition, which may be the result of replaying the ROLLBACK log entries at the respective transaction coordinators. Although these transactions may already be removed from the transaction coordinator, the transaction coordinator may nevertheless confirm a cleanup request thus ensuring that the rollback transaction table (RTT) at the data partition may be cleaned up.

Upon receiving a cleanup request from a data partition, the transaction coordinator may, if the transaction control block of the corresponding transaction still exists and the data partition is listed as a participant in the transaction control block (e.g., part of the TCB.participants[ ] array), the transaction coordinator may remove the data partition as a participant. The transaction control block may be eligible for garbage collection if, upon removal of the data partition, the transaction control block includes no more participants for the transaction. The transaction coordinator may thus write a CLEANUP log record to persist information about the removed participant and wait until the CLEANUP record is durably persisted to confirm the removal of the data partition as a participant from the transaction control block. Otherwise, if the transaction control block for the transaction no longer exists, the transaction coordinator may confirm the removal of the participant despite the transaction control block being non-existent.

In the event a failover occurs at the transaction coordinator, a restart of the transaction coordinator may trigger attempts to re-abort all transactions that have been aborted but have not yet undergone a cleanup (e.g., the transactions remaining in the coordinator rollback transaction table (CRTT)). This may be done by the transaction coordinator sending ABORT messages to those participating data partitions that have not responded to the CLEANUP request. Thus, whether the failover occurred at a participating data partition or the transaction coordinator, the rollback transaction table (RTT) at the data partition and the coordinator rollback transaction table (CRTT) at the transaction coordinator may be cleaned up to ensure that all aborted transactions are rolled back.

Figure 5:
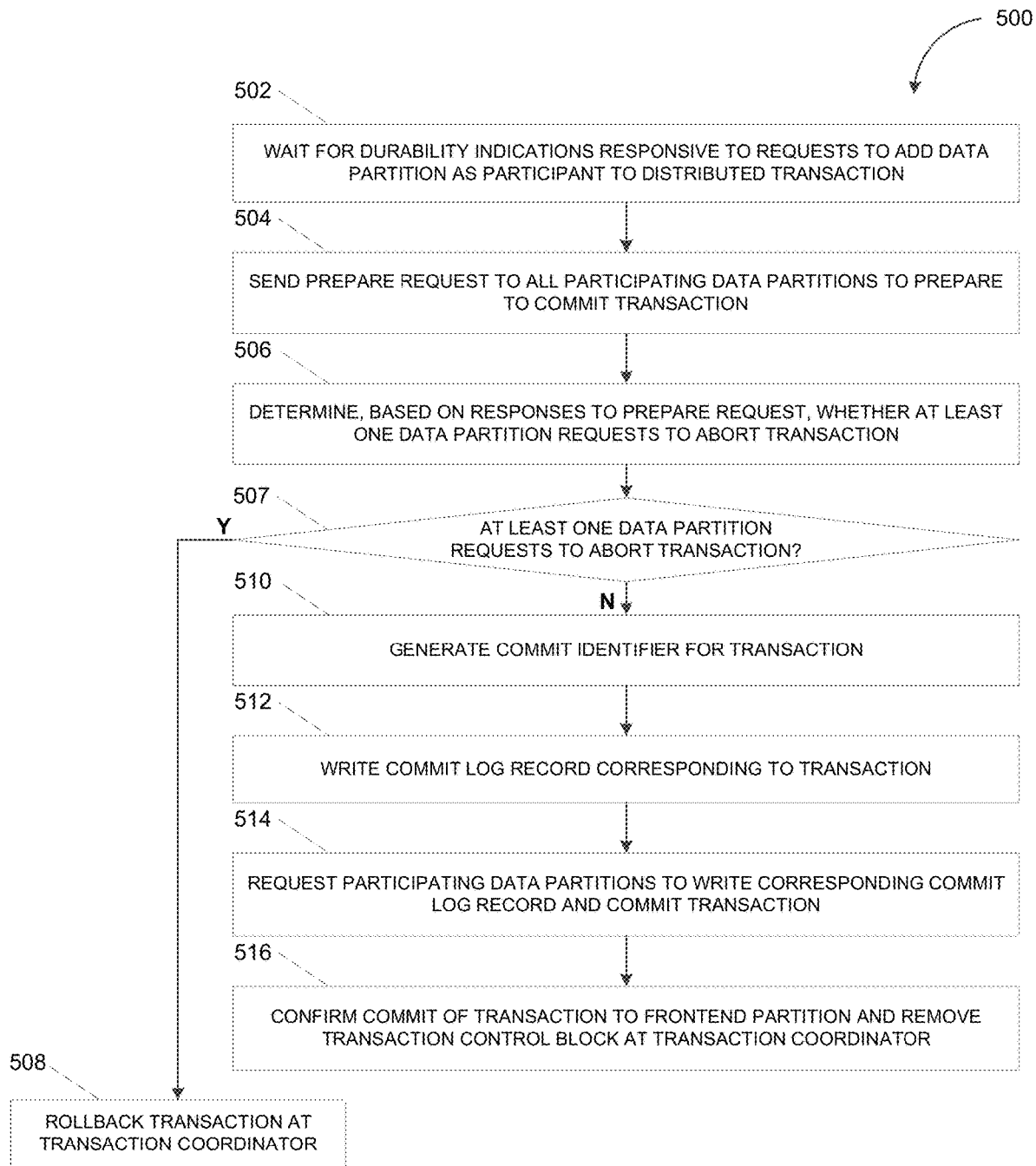
FIG. 5 depicts a flowchart illustrating an example of a process for committing a distributed transaction at a transaction coordinator, in accordance with some example embodiments.

A transaction may be committed when all the operations included in the transaction are complete. When that happens, the client machine 120 may request to commit the transaction via the frontend driver at the frontend partition 150. If the transaction is a distributed transaction involving multiple data partitions and a transaction coordinator (e.g., TCB.coordinator is set), the frontend driver may delegate the commit processing to the transaction coordinator. FIG. 5 depicts a flowchart illustrating an example of a process 500 for committing a distributed transaction at a transaction coordinator, in accordance with some example embodiments. At 502, the transaction coordinator may wait for durability indications responsive to requests to add a data partition as participant to a distributed transaction. For instance, the transaction coordinator at the transaction coordinator partition 160 may wait for any outstanding durability notifications for ADD_PARTICIPANT requests indicating that the TCB.participants[ ].start_written is set to TRUE for all data partitions involved in the transaction.

At 504, the transaction coordinator may send a prepare request to all participating data partitions to prepare to commit the transaction. Each data partition may determine whether the transaction may be committed. If a data partition determines that the transaction may be committed, that data partition may set the transaction control block of the transaction at the data partition to a PREPARING state. The data partition may also write a corresponding PREPARE log record and inform the transaction coordinator once the record is durably written. Contrastingly, if the data partition determines that the transaction cannot be committed, the data partition may set the transaction control block of the transaction to an ABORTING state and start background processes to perform post-rollback operations. The transaction control block may subsequently be set to an ABORTED state when these post-rollback operations are complete such that the transaction control block is eligible for garbage collection. The data partition may also write an ABORT log record and enter the transaction in the rollback transaction table (RTT) at the data partition. The data partition may inform the transaction coordinator of the ABORT log record without waiting for the record to be durably written. Moreover, once the ABORT log record is durably, the data partition may send a cleanup request to the transaction coordinator.

At 506, the transaction coordinator may determine, based on the responses to the prepare request, whether at least one data partition requests to abort the transaction. At 507-Y, the transaction coordinator may determine that at least one data partition requests to abort the transaction. As such, at 508, the transaction coordinator may rollback the transaction at the transaction coordinator. Alternatively, at 507-N, the transaction coordinator may determine that every data partition request to commit the transaction. Accordingly, at 510, the transaction coordinator may generate a commit identifier. This commit identifier may be generated using a variety of techniques including for example, by inquiring a global timestamp sequence in the case of a multi-version concurrency control protocol. At 512, the transaction coordinator may write a COMMIT log record at the transaction coordinator partition. Furthermore, at 514, once the COMMIT log record is durably written, the transaction coordinator may ask every participating data partition to write a corresponding COMMIT log record and commit the transaction. At 516, once the COMMIT log record is durably written at every participating data partition, the transaction coordinator may confirm the commit to the frontend driver and remove the transaction control block of the transaction.

As an optimization, the transaction coordinator might send a message to each participating data partition to switch the state of the transaction control block to COMMITTING and set a commit identifier before the COMMIT log entry is persisted at the transaction coordinator in order to avoid unnecessary latency when determining the visibility of data associated with recently committed transaction at the data partitions. However, the COMMIT log record at a data partition may not be written before the COMMIT log record at the transaction coordinator is durably persisted. Otherwise, it may be possible to encounter a failure pattern in which a portion of the transaction is committed but another portion of the transaction is not committed. This pattern may occur when the transaction coordinator fails after writing the COMMIT log record but not before finishing the write and while a data partition would have already persisted its COMMIT log record. A data recovery from a backup with this error state may cause the transaction coordinator to roll back incomplete transaction in an effort to recover the transaction with one participating data partition having already committed a portion of the transaction. Since a transaction is assumed to be committed by default, it may be unnecessary to store a list of committed transactions on the transaction coordinator.

In the event of a failover at a data partition, the recovery process may be performed once the data partition restarts. In addition to handling local transaction affecting a single data partition, the recovery process may be extended to handle distributed transactions affecting multiple data partitions. In some example embodiments, the recovery at individual data partitions, such as the first participant partition 140*a* and the second participant partition 140*b*, may be performed based on log entries included in the transaction log, such as DML, commit and rollback log entries maintained at each partition. For a local transaction that is yet to be committed, the local transaction may be associated with a log record with a new transaction identifier. Recovery of such a local transaction may include the data partition creating a corresponding transaction control block (TCB) in a RUNNING state but without any transaction coordinators (e.g., TCB.coordinator is empty). Alternatively, a local transaction that has been committed may be associated with a commit log entry and a transaction control block with an empty transaction coordinator list. For a committed local transaction, the data partition may set the state of the transaction control block to COMMITTING as well as the commit identifier (e.g., TCB.commit_id) to the identifier found in the COMMIT log record. The data partition may also initiate background processes to perform one or more post-commit operations before setting the state of the transaction control block (e.g., TCB_state) to COMMITTED, which may enable the garbage collection of the transaction control block. There may be no need to notify the transaction coordinator because there is no transaction coordinator for local transactions, which are coordinated by the the respective data partition instead.

An aborted transaction may be associated with a rollback log entry and a transaction control block (TCB) with an empty transaction coordinator list. To recover the aborted transaction, the data partition may set the state of the transaction control block to ABORTING. If the transaction is associated with a transaction coordinator (e.g., the TCB.coordinator of the transaction control block is set), the transaction may be inserted into the rollback transaction table (RTT) of the data partition and the transaction coordinator may be notified to clean up the data partition as a participant. The data partition may also initiate background processes to perform one or more post-rollback operations. Once the post-rollback operations are complete, the data partition may set the state of the transaction control block to ABORTED, thereby enabling the garbage collection of the transaction control block.

Figure 6:
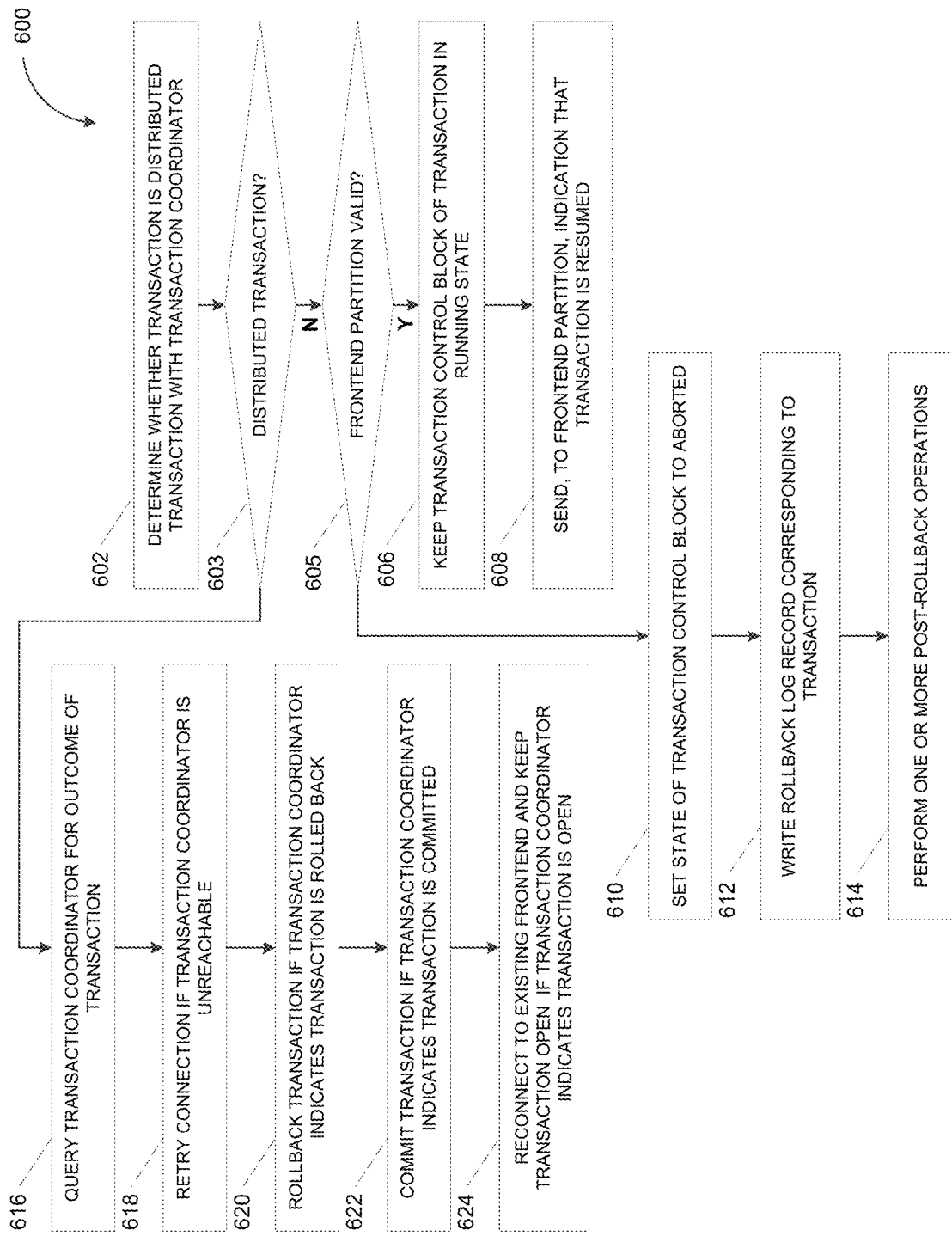
FIG. 6 depicts a flowchart illustrating an example of a process for handling post-recovery open distributed transactions, in accordance with some example embodiments.

As noted, some transactions may remain open at the data partition upon completion of the recovery process. Some of these lingering open transactions may be distributed transactions (e.g., with TCB.state RUNNING or PREPARED). FIG. 6 depicts a flowchart illustrating an example of a process 600 for handling post-recovery open distributed transactions, in accordance with some example embodiments.

At 602, the data partition determines whether the transaction is a distributed transaction coordinated by a transaction coordinator. At 603-N, the data partition may determine that the transaction is not a distributed transaction. For example, the data partition may determine that the transaction is not a distributed transaction if the transaction control block of the transaction indicates a lack of a transaction coordinator (e.g., TCB.coodinator array is empty). For a non-distributed, local transaction affecting just the data partition, at 604, the data partition may determine whether the frontend partition associated with the transaction is valid. For instance, the data partition may determine whether the TCB.client included in the transaction control block (TCB) of the transaction still points to a valid frontend partition hosting a frontend driver for the transaction.

At 605-Y, the data partition may determine that the frontend partition of the transaction is valid. When that is the case, at 606, the data partition may keep the transaction control block of the transaction in a RUNNING state. Moreover, at 608, the data partition may send, to the frontend partition of the transaction, an indication that the transaction is resumed. It should be appreciated that the frontend driver at the frontend partition of the transaction may, upon receiving the indication from the data partition, determine that a transaction control block for the transaction is absent from the frontend partition. If the frontend partition lacks a transaction control block for the transaction, the frontend driver may request a rollback of the transaction.

Alternatively, at 605-N, the data partition may determine that the frontend partition of the transaction is invalid. At 610, absent a valid frontend partition, the data partition may set the state of the transaction control block to ABORTED. Moreover, at 612, the data partition may write a ROLLBACK log record. At 614, the data partition may initiate background processes to perform one or more post-rollback operations. Once the background processes are complete, at 614, the data partition may set the state of the transaction control block to ABORTED. Doing so may, as noted, render the transaction control block of the transaction eligible for garbage collection.

Returning to operation 603 of the process 600, at 603-Y, the data partition may determine instead that the transaction is a distributed transaction. The data partition may determine that the transaction is a distributed transaction if the TCB.coordinator array included in the transaction control block of the transaction is not empty. At 616, the data partition may query the transaction coordinator for an outcome of the transaction. At 618, the data partition may respond to the transaction coordinator being unreachable by retrying. For example, the data partition may request notification from the connection layer once the transaction coordinator becomes available and retry while the transaction control block of the transaction is maintained in a RUNNING or PREPARED state.

At 620, if the transaction coordinator indicates that the transaction is rolled back, the data partition may perform a rollback of the transaction at the data partition. For example, the rollback of the transaction may include the data partition setting the transaction control block of the transaction to an ABORTING state, writing a ROLLBACK log record corresponding to the transaction, and updating the rollback transaction table (RTT) at the data partition with a corresponding entry. The data partition may further perform one or more post-rollback operations before setting the state of the transaction control block to an ABORTED state to enable the garbage collection of the transaction control block.

At 622, if the transaction coordinator indicates that the transaction is committed, the data partition may commit the transaction at the data partition. For example, the committing of the transaction may include the data partition determining whether the transaction can be committed (e.g., whether a conflict exists) and setting the transaction control block of the transaction to a PREPARING state and writing a PREPARE log entry if the transaction can be committed. Else, at 624, the data partition may determine, based on the response from the transaction coordinator, that the transaction is open. In that case, the data partition may reconnect to the existing frontend while keeping the transaction open.

When querying the state of the transaction at the transaction coordinator, the transaction control block of the transaction may be present at the transaction coordinator partition, in which case the transaction coordinator may return the state of the transaction control block (e.g., TCB.state). Alternatively, the transaction control block of the transaction may no longer exist at the transaction coordinator partition, for example, if the transaction coordinator already committed the transaction. If the transaction control block of the transaction is absent from the transaction coordinator partition, the transaction coordinator may return COMMITTED as the outcome of the transaction. The COMMITTED outcome may be the default outcome of a transaction at the distributed data storage system 100. In the case of a rolled back transaction, the transaction control block of the transaction may persist at the transaction coordinator partition until all participating data partitions have confirmed rollback of the transaction (e.g., via cleanup requests).

In some example embodiments, the distributed data storage system 100 may be scaled-out with the addition of one or more transaction coordinator partitions. Alternatively, the distributed data storage system 100 may also be scaled-in, for example, with the decommissioning of one or more transaction coordinator partitions. When decommissioning a transaction coordinator partition, such as the transaction coordinator partition 160, the transaction coordinator partition may be first marked as to-be-removed and no new transactions may be delegated to the partition for coordination. The decommissioning of the transaction coordinator partition may include removing the transaction control blocks managed by the transaction coordinator hosted at the transaction coordinator partition once the corresponding transactions are either committed or rolled back and cleaned up. When no transaction control blocks remain at the transaction coordinator partition, the transaction coordinator partition may be deleted. Nevertheless, snapshots and log backups of the transaction coordinator partition may remain available for the duration of backup retention period.

In some example embodiments, rollback requests and commit requests from the frontend driver to the transaction coordinator by themselves may constitute local transactions at the transaction coordinator. Thus, it may be possible to compose transaction coordinators by one transaction coordinator acting as the frontend driver to a set of other transaction coordinators, thus allowing cross-domain transactions. Similarly, this method may be used to allow the transaction coordinator to participate as a resource manager in X/Open XA distributed transaction protocol driven from the outside of the distributed data storage system 100.

Figure 7A:
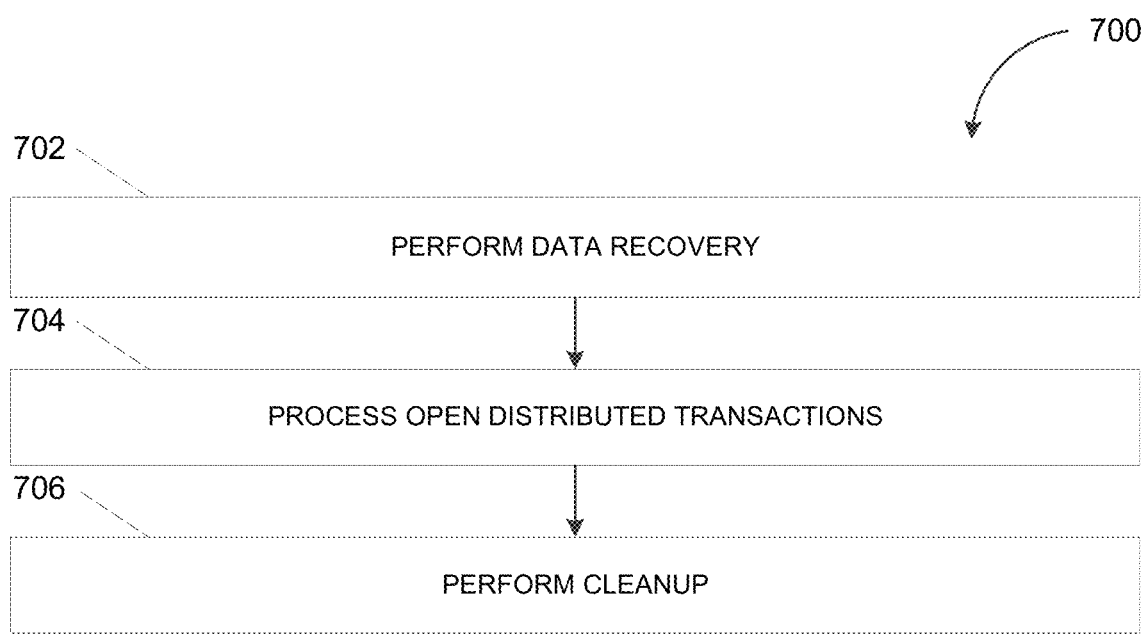
FIG. 7A depicts a flowchart illustrating an example of a process for performing a partial recovery, in accordance with some example embodiments.

FIG. 7A depicts a flowchart illustrating an example of a process 700 for performing a partial recovery, in accordance with some example embodiments. Referring to FIGS. 1A-B and 7A, the process 700 may be performed at the distributed data storage system 100 to recover one or more of the data partitions included in the distributed data storage system 100 including, for example, the first participant partition 140a, the second participant partition 140b, the transaction coordinator partition 160, and/or the like. This recovery may be performed to restore the one or more data partitions to a state prior to a specified point in time.

At 702, the distributed data storage system 100 may perform a data recovery. In some example embodiments, data recovery at the distributed data storage system 100 may include provisioning a new copy for each of the data partitions to be recovered. This may include, for example, the data partitions containing a database table that requires recovery, the data partitions containing a single tenant database that requires recovery, and/or the like. Each copy of the data partition may be initialized with the last snapshot of the data partition snapshot with a timestamp before the specified point in time of the recovery. These copies of the data partitions may be non-redundant because they are being used for recovery.

Point-in-time recovery may be performed at each data partition by applying log backups sequentially (e.g., sorted by log backup timestamp) until the specified point in time is reached. As noted, point-in-time recovery may include the recovery of data up to a specific point in time in the past. Thus, the last log segment (which is now part of the data partition copy) may be truncated to this point in time. If needed and if the original data partition is accessible, the last log segment to recover may be taken from the original data partition. Doing so may yield, for each data partition, a set of open transactions at the end of the recovery process. Local transactions, which affects a single participant partition, may be aborted but distributed transactions in an open state or a pre-commit state may require additional handling. As will be discussed in further detail, point-in-time recovery may be performed for a specific point in time that is either within a time safety threshold or outside of the time safety threshold. This time safety threshold may correspond to the timestamp associated with the least recent last committed transaction in the backup logs of the data partitions being recovered.

At 704, the distributed data storage system 100 may process distributed transactions that remain open. As noted, although open local transactions may be aborted upon completion of the recovery process, distributed transactions may require additional handling. For example, to handle distributed transactions that remain open subsequent to a recovery, the distributed data storage system 100 may compile a set of transaction coordinators that were used to coordinate the still-open distributed transactions. These transaction coordinators may be identified based on the open transaction sets associated with the copies of the data partitions provisioned as part of the recovery process. Non-redundant copies of the transaction coordinator partitions may be provisioned and point-in-time recovery may be performed for each copy of the transaction coordinator partitions. The last log segment to recover (if needed) may be taken from the original transaction coordinator partition if that transaction coordinator partition is still accessible.

Any transactions that remain open at the end of point-in-time recovery at the respective transaction coordinator partition may be aborted. It should be appreciated that because transaction coordinator partitions contain small quantities of data, recovery of a transaction coordinator partition may be completed relatively quickly. Each recovered data partition may then query the recovered transaction coordinator partition regarding the outcome of open distributed transactions and close them accordingly (e.g., either commit or rollback). The handling of open transactions may begin as soon as recovery at a first data partition is complete. Additional transaction coordinator partitions may be added as additional data partitions completes recovery.

At 706, the distributed data storage system 100 may perform a cleanup. In some example embodiments, cleanup after recovery includes dropping the copies of the transaction coordinator partition because those are no longer needed once recovery is complete. At this point, all transactions in the copies of the participant partitions may be either committed or rolled back whereas new transactions on the participant partitions may use the existing transaction coordinator partitions.

In some example embodiments, if the recovery is to a point in time past a time safety threshold (e.g., max_safe_ts=min(newest log backup timestamps of all data partitions being recovered)), it may be possible that a portion of the backup log at one or more data partitions is missing. Whether a portion of the backup log at one or more data partitions is missing may be verified by tracking additional information and performing checks upon completion of recovery.

Figure 7B:
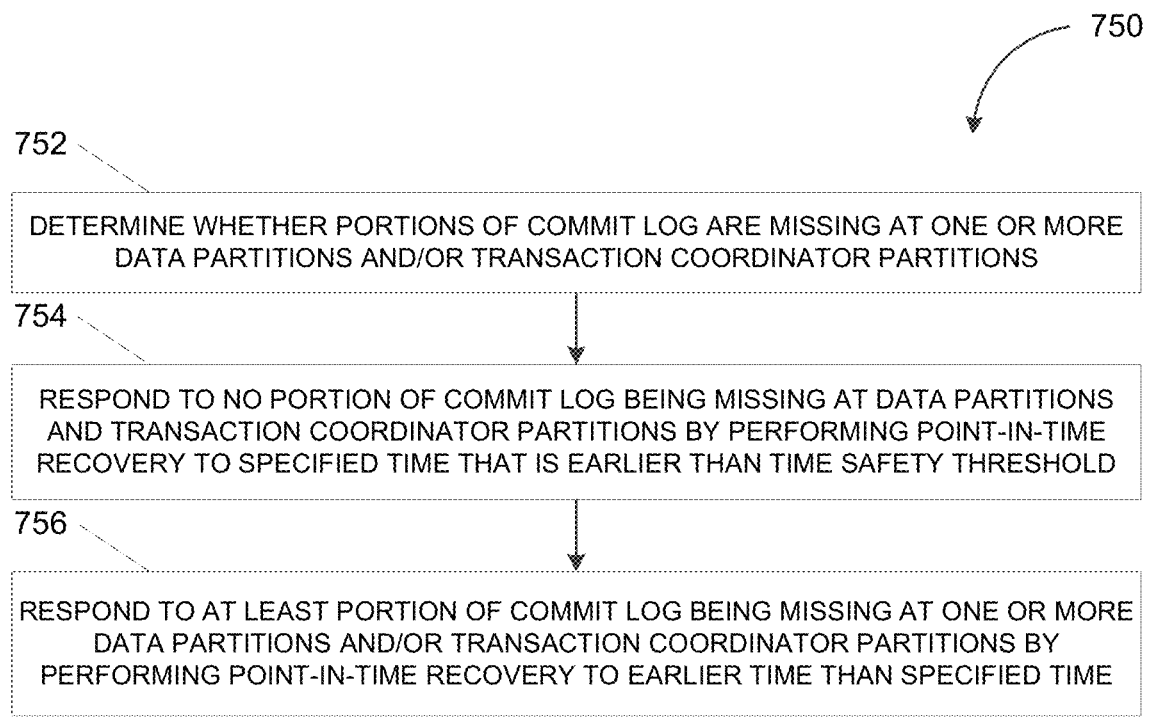
FIG. 7B depicts a flowchart illustrating an example of a process for performing a recovery past a time safety threshold in accordance with some example embodiments.

To further illustrate, FIG. 7B depicts an example of a process 750 for performing a recovery past a time safety threshold, in accordance with some example embodiments. Referring to FIGS. 1A-B and 7B, the process 750 may be performed at the distributed data storage system 100 to recover one or more of the data partitions included in the distributed data storage system 100 including, for example, the first participant partition 140*a*, the second participant partition 140*b*, the transaction coordinator partition 160, and/or the like. This recovery may be performed to restore the one or more data partitions to a state prior to a specified point in time that is earlier than a time safety threshold corresponding to the timestamp associated with the least recent last committed transaction in the backup logs of the data partitions being recovered.

At 752, the distributed data storage system 100 may determine whether portions of a commit log are missing at one or more data partitions and/or transaction coordinator partitions. For example, each replica of a data partition may maintain a list of committed distributed transactions that occurred past the time safety threshold. Moreover, each replica of transaction coordinator partition may maintain a list of committed distributed transactions that occurred past the time safety threshold and data partitions participating in those transactions. Upon completion of recovery, the distributed data storage system 100 may determine whether the data partitions participating in the transactions that occurred beyond the time safety threshold have seen their commit in the log. This check may be performed to detect missing portions of commit logs at individual data partitions. Furthermore, the distributed data storage system 100 may determine whether the distributed transactions at individual replicas of data partitions are known to at least some replicas of the transaction coordinator. This check may be performed to detect missing portions of commit logs at transaction coordinator partitions.

At 754, the distributed data storage system 100 may respond to no portion of the commit log being missing at the data partitions and the transaction coordinator partitions by performing the point-in-time recovery to a specified time that is earlier than a time safety threshold. In the event the distributed data storage system 100 determines that there are no portions of the commit log are missing at the data partitions and the transaction coordinator partitions, the point-in-time recovery to the point in time past the time safety threshold may be performed successfully. This may be the case if all committed distributed transactions that occurred past the time safety threshold are committed at the corresponding data partitions and transaction coordinator partitions.

At 756, the distributed data storage system 100 may respond to at least a portion of the commit log being missing at the one or more data partitions and/or the transaction coordinator partitions by performing the point-in-time recovery to an earlier time than the specified point in time. Contrastingly, if the distributed data storage system 100 determines that at least some portions of the commit log are missing at the data partitions and/or the transaction coordinator partitions, the point-in-time recovery may be performed to an earlier time than specified. For example, this earlier time may correspond to the latest distributed transaction commit timestamp seen by the data partitions participating in the transaction with recovery being retried to this earlier point in time.

The time safety threshold may be tracked locally during the data recovery performed as part of operation 702. Each replica of data partition being recovered by adjust the specified point in time to an earlier time whenever a new transaction coordinator partition is detected in the log. That is, if the newest log backup timestamp of the newly-discovered transaction coordinator partition is less than the current time safety threshold, then the current time safety threshold may be adjusted to the newest log backup timestamp of the newly-found transaction coordinator partition. This optimization may enable the recovery to be completed in a single pass.

FIG. 8 depicts a block diagram illustrating a computing system 800 consistent with implementations of the current subject matter. Referring to FIGS. 1-8, the computing system 800 can be used to implement the distributed data storage system 100 and/or any components therein.

As shown in FIG. 8, the computing system 800 can include a processor 810, a memory 820, a storage device 830, and input/output devices 840. The processor 810, the memory 820, the storage device 830, and the input/output devices 840 can be interconnected via a system bus 850. The processor 810 is capable of processing instructions for execution within the computing system 800. Such executed instructions can implement one or more components of, for example, the distributed data storage system 100. In some example embodiments, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a floppy disk device, a hard disk device, an optical disk device, or a tape device, or other suitable persistent storage means. The input/output device 840 provides input/output operations for the computing system 800. In some example embodiments, the input/output device 840 includes a keyboard and/or pointing device. In various implementations, the input/output device 840 includes a display unit for displaying graphical user interfaces.

According to some example embodiments, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some example embodiments, the computing system 800 can be used to execute various interactive computer software applications that can be used for organization, analysis and/or storage of data in various formats. Alternatively, the computing system 800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system comprising: at least one data processor; and at least one memory storing instructions, which when executed by the at least one data processor, result in operations comprising: responding to a transaction by sending, to a first data partition participating in the transaction, a first request to set a first transaction control block at the first data partition to a preparing state; in response to the transaction affecting a plurality of data partitions including the first data partition and a second data partition, sending, to the second data partition, a second request to set a second transaction control block at the second data partition to the preparing state, and sending, to a transaction coordinator, a third request to add the first data partition and the second data partition as participants of the transaction, the transaction coordinator determining, based at least on a first response of the first data partition to the first request and a second response of the second data partition to the second request, an outcome of the transaction, the transaction being rolled back in response to the first response and/or the second response indicating an inability to commit the transaction.

Example 2: The system of example 1, wherein the transaction is rolled back by the transaction coordinator sending, to each of the first data partition and the second data partition, a fourth request to abort the transaction.

Example 3: The system of example 2, wherein the first data partition responds to the fourth request by at least setting the first transaction control block to an aborting state, and wherein the second data partition responds to the fourth request by at least setting the second transaction control block to the aborting state.

Example 4: The system of example 3, wherein the first transaction control block and the second transaction control block are set to an aborted state upon writing a rollback log record for the transaction and completing one or more post-rollback operations, and wherein setting the first transaction control block and the second transaction control block to the aborted state renders the first transaction control block and the second transaction control block eligible for garbage collection.

Example 5: The system of any one of examples 2 to 4, wherein the first data partition and the second data partition respond to the fourth request by at least writing, at each of the first data partition and the second data partition, an abort log record for the transaction.

Example 6: The system of any one of examples 1 to 5, wherein the transaction is committed in response to the first response and the second response requesting to commit the transaction, and wherein the transaction coordinator commits the transaction by at least writing a commit log record for the transaction.

Example 7: The system of example 6, wherein the transaction coordinator further commits the transaction by at least sending, to each of the first data partition and the second data partition, a fourth request to write a corresponding commit log record for the transaction.

Example 8: The system of example 7, wherein the first transaction control block and the second transaction control block are removed upon each of the first data partition and the second data partition writing the corresponding commit log record for the transaction.

Example 9: The system of any one of examples 1 to 8, further comprising: selecting the transaction coordinator for the transaction in response to determining that no transaction coordinator is associated with the transaction.

Example 10: The system of any one of examples 1 to 9, wherein the transaction coordinator generates, at the transaction coordinator, a third transaction control block for the transaction in response to determining that no transaction control block exists for the transaction at the transaction coordinator, and wherein the transaction coordinator updates the third transaction control block by at least including the first data partition and the second data partition as participants of the transaction.

Example 11: The system of any one of examples 1 to 10, wherein the transaction is determined to be a local transaction based at least on the transaction affecting a single data partition.

Example 12: The system of example 11, wherein the local transaction is executed at the first data partition by at least determining whether the transaction is associated with one or more conflicts.

Example 13: The system of example 12, wherein the first data partition sets the first transaction control block to a committing state in response to the transaction being free from conflicts, and wherein the first data partition further sets the first transaction control block to a committed state upon writing a commit log record for the transaction.

Example 14: The system of example 13, wherein the first data partition sets the first transaction control block to an aborting state in response to the transaction being associated with one or more conflicts, and wherein the first data partition further sets the first transaction control block to an aborted state upon writing a rollback log record for the transaction and completing one or more post-rollback operations.

Example 15: The system of any one of examples 1 to 14, further comprising:
communicating, to a client device associated with the transaction, the outcome of the transaction.

Example 16: The system of any one of examples 1 to 15, wherein the transaction is received from a frontend driver.

Example 17: The system of any one of examples 1 to 16, further comprising: determining, based at least on the first transaction control block, that the transaction is in a running state subsequent to a recovery at the first data partition; in response to confirming an existence of the frontend driver subsequent to the recovery at the first data partition, resuming an execution of the transaction; and in response to determining that the frontend driver is nonexistent subsequent to the recovery at the first data partition, roll back the transaction including by setting the first transaction control block to an aborted state and writing a rollback log record for the transaction.

Example 18: The system of any one of examples 1 to 17, further comprising: sending, another transaction coordinator, a fourth request to add the first data partition and/or the second data partition as participants of the transaction.

Example 19: A computer-implemented method, comprising: responding to a transaction by sending, to a first data partition participating in the transaction, a first request to set a first transaction control block at the first data partition to a preparing state; in response to the transaction affecting a plurality of data partitions including the first data partition and a second data partition, sending, to the second data partition, a second request to set a second transaction control block at the second data partition to the preparing state, and sending, to a transaction coordinator, a third request to add the first data partition and the second data partition as participants of the transaction, the transaction coordinator determining, based at least on a first response of the first data partition to the first request and a second response of the second data partition to the second request, an outcome of the transaction, the transaction being rolled back in response to the first response and/or the second response indicating an inability to commit the transaction.

Example 20: A non-transitory computer readable medium storing instructions, which when executed by at least one data processor, result in operations comprising: responding to a transaction by sending, to a first data partition participating in the transaction, a first request to set a first transaction control block at the first data partition to a preparing state; in response to the transaction affecting a plurality of data partitions including the first data partition and a second data partition, sending, to the second data partition, a second request to set a second transaction control block at the second data partition to the preparing state, and sending, to a transaction coordinator, a third request to add the first data partition and the second data partition as participants of the transaction, the transaction coordinator determining, based at least on a first response of the first data partition to the first request and a second response of the second data partition to the second request, an outcome of the transaction, the transaction being rolled back in response to the first response and/or the second response indicating an inability to commit the transaction.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
at least one data processor; and
at least one memory storing instructions which, when executed by the at least one data processor, cause operations comprising:
responding to a transaction by sending, to a first data partition participating in the transaction, a first request to set a first transaction block at the first data partition to a preparing state;
in response to the transaction affecting a plurality of data partitions including the first data partition and a second data partition,
sending, to the second data partition, a second request to set a second transaction block at the second data partition to the preparing state, and
sending, to each transaction coordinator of a plurality of transaction coordinators selected to coordinate the transaction, a third request to add the first data partition and the second data partition as participants of the transaction, each transaction coordinator responding to the third request by at least generating a third transaction block for the transaction and updating the third transaction block to include the first data partition and the second data partition as participants of the transaction, each transaction coordinator coordinating the transaction by at least determining, based at least on a first response from the first data partition to the first request and a second response from the second data partition to the second request, an outcome of the transaction, and determining to roll back the transaction in response to the first response and/or the second response indicating that the outcome of the transaction is a failure to commit the transaction, the transaction being rolled back by each of the transaction coordinators sending a fourth request to abort the transaction that causes the first data partition to set the first transaction block to an aborting state and the second data partition to set the second transaction block to the aborting state.

2. The system of claim 1, wherein the first transaction block and the second transaction block are set to the aborting state upon writing a rollback log record for the transaction and completing one or more post-rollback operations, and wherein setting the first transaction block and the second transaction block to the aborting state renders the first transaction block and the second transaction block eligible for garbage collection.

3. The system of claim 1, wherein the first data partition and the second data partition further respond to the fourth request by at least writing, at each of the first data partition and the second data partition, an abort log record for the transaction.

4. The system of claim 1, wherein the transaction is committed in response to the first response and the second response requesting to commit the transaction, and wherein each transaction coordinator commits the transaction by at least writing a commit log record for the transaction.

5. The system of claim 4, wherein each transaction coordinator further commits the transaction by at least sending, to each of the first data partition and the second data partition, a fourth request to write a corresponding commit log record for the transaction.

6. The system of claim 5, wherein the first transaction block and the second transaction block are removed upon each of the first data partition and the second data partition writing the corresponding commit log record for the transaction.

7. The system of claim 1, further comprising:
selecting the plurality of transaction coordinators to coordinate the transaction in response to determining that no transaction coordinator is associated with the transaction.

8. The system of claim 1, wherein the third transaction block for the transaction is generated at each transaction coordinator in response to determining that no transaction block exists for the transaction.

9. The system of claim 1, wherein the transaction is determined to be a local transaction based at least on the transaction affecting a single data partition.

10. The system of claim 9, wherein the local transaction is executed at the first data partition by at least determining whether the transaction is associated with one or more conflicts.

11. The system of claim 10, wherein the first data partition sets the first transaction block to a committing state in response to the transaction being free from conflicts, and wherein the first data partition further sets the first transaction block to a committed state upon writing a commit log record for the transaction.

12. The system of claim 11, wherein the first data partition sets the first transaction block to the aborting state in response to the transaction being associated with one or more conflicts, and wherein the first data partition further sets the first transaction block to the aborting state upon writing a rollback log record for the transaction and completing one or more post-rollback operations.

13. The system of claim 1, further comprising:
communicating, to a client device associated with the transaction, the outcome of the transaction.

14. The system of claim 1, wherein the transaction is received from a frontend driver.

15. The system of claim 1, further comprising:
determining, based at least on the first transaction block, that the transaction is in a running state subsequent to a recovery at the first data partition;
in response to confirming an existence of a frontend driver subsequent to the recovery at the first data partition, resuming an execution of the transaction; and
in response to determining that the frontend driver is nonexistent subsequent to the recovery at the first data partition, roll back the transaction including by setting the first transaction block to an aborted state and writing a rollback log record for the transaction.

16. A computer-implemented method, comprising:
responding to a transaction by sending, to a first data partition participating in the transaction, a first request to set a first transaction block at the first data partition to a preparing state;
in response to the transaction affecting a plurality of data partitions including the first data partition and a second data partition,
sending, to the second data partition, a second request to set a second transaction block at the second data partition to the preparing state, and
sending, to each transaction coordinator of a plurality of transaction coordinators selected to coordinate the transaction, a third request to add the first data partition and the second data partition as participants of the transaction, each transaction coordinator responding to the third request by at least generating a third transaction block for the transaction and updating the third transaction block to include the first data partition and the second data partition as participants of the transaction, each transaction coordinator coordinating the transaction by at least determining, based at least on a first response from the first data partition to the first request and a second response from the second data partition to the second request, an outcome of the transaction, and determining to roll back the transaction in response to the first response and/or the second response indicating that the outcome of the transaction is a failure to commit the transaction, the transaction being rolled back by each of the transaction coordinators sending a fourth request to abort the transaction that causes the first data partition to set the first transaction block to an aborting state and the second data partition to set the second transaction block to the aborting state.

17. A non-transitory computer readable medium storing instructions, which when executed by at least one data processor, result in operations comprising:
   responding to a transaction by sending, to a first data partition participating in the transaction, a first request to set a first transaction block at the first data partition to a preparing state;
   in response to the transaction affecting a plurality of data partitions including the first data partition and a second data partition,
   sending, to the second data partition, a second request to set a second transaction block at the second data partition to the preparing state, and
   sending, to each transaction coordinator of a plurality of transaction coordinators selected to coordinate the transaction, a third request to add the first data partition and the second data partition as participants of the transaction, each transaction coordinator responding to the third request by at least generating a third transaction block for the transaction and updating the third transaction block to include the first data partition and the second data partition as participants of the transaction, each transaction coordinator coordinating the transaction by at least determining, based at least on a first response from the first data partition to the first request and a second response from the second data partition to the second request, an outcome of the transaction, and determining to roll back the transaction in response to the first response and/or the second response indicating that the outcome of the transaction is a failure to commit the transaction, the transaction being rolled back by each of the transaction coordinators sending a fourth request to abort the transaction that causes the first data partition to set the first transaction block to an aborting state and the second data partition to set the second transaction block to the aborting state.

* * * * *